United States Patent [19]
Kosaka

[11] Patent Number: 5,675,432
[45] Date of Patent: Oct. 7, 1997

[54] OPTICAL AMPLIFICATION APPARATUS

[75] Inventor: Junya Kosaka, Fujisawa, Japan

[73] Assignee: Hitachi, Ltd., Tokyo, Japan

[21] Appl. No.: 626,951

[22] Filed: Apr. 3, 1996

[30] Foreign Application Priority Data

Apr. 5, 1995 [JP] Japan ................... 7-080559

[51] Int. Cl.$^6$ ................... H01S 3/00
[52] U.S. Cl. ................... 359/341; 359/176; 359/177
[58] Field of Search ................... 359/341, 176, 359/177

[56] References Cited

U.S. PATENT DOCUMENTS

| 5,392,154 | 2/1995 | Chang et al. | 359/341 |
| 5,452,116 | 9/1995 | Kirkby et al. | 359/124 |

*Primary Examiner*—Mark Hellner
*Attorney, Agent, or Firm*—Antonelli, Terry, Stout & Kraus, LLP.

[57] ABSTRACT

An optical amplification apparatus for adjusting optical power of wavelength-multiplexed signal light at respective wavelengths and for adjusting the optical output power at the respective wavelengths and a deviation of the optical output power between the wavelengths. An optical power adjusting unit for receiving inputted light having signal light at a plurality of different wavelengths ($\lambda_1, \lambda_2, \lambda_3, \ldots, \lambda_N$) multiplexed thereon, amplifying or attenuating light at least one wavelength included in the received light independently of light at different wavelengths from the wavelength of the light, is provided before or after an optical amplifier unit for amplifying the light having the signal light at the plurality of different wavelengths multiplexed thereon. Further, a control unit is provided for controlling the gain of amplification or attenuation performed by the optical power adjusting unit and the gain of amplification performed by the optical amplifier unit, respectively.

47 Claims, 16 Drawing Sheets

1

OPTICAL AMPLIFICATION APPARATUS

BACKGROUND OF THE INVENTION

The present invention relates to optical amplification apparatus for use in optical transmission systems and so on.

As a reduction in cost has been demanded for optical transmission systems, a wavelength-multiplex optical transmission has been taken into consideration for transmitting signal light at one or more mutually different wavelengths on a single transmission fiber. It is also thought that an amplifier suitable for use in such wavelength-multiplex optical transmission is an optical amplification apparatus which has a wide amplification wave band and is capable of achieving the amplification with less noise.

It is known, however, that a rare metal added optical fiber and a semiconductor optical amplifier constituting the above-mentioned optical amplification apparatus have a gain dependency so that optical outputs and gains at respective wavelengths present deviations due to the difference in wavelengths after amplification. For this reason, the optical power at different wavelengths after transmission involves a deviation due to the difference in wavelengths. Particularly, if a number of optical amplifiers are used to relay signal light at multiple stages, the deviation of optical power between different wavelengths, generated at respective relay stages, are accumulated as the signal light is relayed from one stage to next, thus increasing the deviation of optical power between the different wavelengths.

In the wavelength-multiplex optical transmission, since the wavelength signal having the lowest power of all multiplexed wavelengths must be regarded as a lower limit value of received power after transmission, a maximum transmission distance in the wavelength-multiplex transmission is limited by the wavelength signal having the lowest power. Thus, it is of great importance to reduce the deviation of power between different wavelengths in the output of an optical amplification apparatus, in order to extend a maximum relay transmission distance.

To solve this problem, an article titled "Collective Smoothing of Multiple Wavelength Amplification Characteristics of Fiber Optic Amplifier Using Fiber Amplification Ratio Control" Technical Reports of the Institute of Electronics, Information and Communications OCS94-66, OPE94-88 (1944-11) has proposed the following technique.

FIG. 1 illustrates the configuration of an optical amplification apparatus according to the technique disclosed in the article. Referring specifically to FIG. 1, the optical amplification apparatus includes an erbium-added optical fiber 51, an optical isolator 52, a light combiner 53, an excitation light source 54, an optical attenuator 55, an optical coupler 56 for splitting the output of the optical attenuator 55, and a light detector 57 for detecting split light.

In the disclosed technique, the illustrated optical amplification apparatus is controlled by an auto fiber gain controller (AFGC) such that a fiber gain remains at 12 dB, thereby minimizing a deviation of gain between respective wavelengths. In addition, an auto power controller (APC) implemented by the optical attenuator 55 is used to prevent a change in relay amplification ratio from affecting the gain spectrum.

It has been reported that, according to theoretical calculations, the optical amplification apparatus presented a minimum gain deviation between respective wavelengths, which is 0.12 dB or less, when the erbium-added optical fiber 50 had a length of 11 meters, assuming that a deviation of gain between the respective wavelengths of input light was 0 dB. It has been also reported that after the optical amplification apparatus has been used to relay light having four different wavelengths multiplexed thereon 60 times, a gain deviation was 1.5 dB or less.

Optical losses during transmission may vary from one case to another due to a difference in fiber loss within each relayed area, a difference in optical power between adjacent wavelengths, and so on. Additionally, in an actual use, relayed distances and fiber losses in respective areas are not always constant. It is therefore difficult to predict a deviation of gain between respective wavelengths and optical power at the respective wavelengths in an actual use. Therefore, the optical amplification apparatus illustrated in FIG. 1 has a problem in an actual use that if an input level changes or if a deviation of gain occurs between input wavelengths, the optical amplification apparatus cannot reduce a deviation of gain between output wavelengths to 0 dB.

Also, when the optical amplification apparatus illustrated in FIG. 1 is used, if an independent fluctuation in output power of signal light at a certain wavelength caused by an external factor, for example, is to be suppressed, stable output power of signal light at the remaining wavelengths is also suppressed simultaneously, thus adversely affecting the stability of the output power of the signal light at the different wavelengths.

Further, since the optical amplification apparatus illustrated in FIG. 1 is dependent on the gain thereof for establishing an optimal condition for eliminating the deviation of gain between wavelengths, it cannot freely set outputs of signal lights. More specifically, since a relayed distance is limited by the optical amplification apparatus the freedom in designing the architecture of a transmission system is restricted. The optical amplification apparatus illustrated in FIG. 1 additionally has a problem that it must be optimized to eliminate a deviation of gain between wavelengths is each relay area.

SUMMARY OF THE INVENTION

It is a principal object of the present invention to provide an optical amplification apparatus which is capable of arbitrarily adjusting optical output power at respective wavelengths of wavelength-multiplexed signal light and a deviation in optical power between the respective wavelengths.

It is another object of the present invention to provide an optical amplification apparatus which uniformly increases or decreases input power of signal light at respective wavelengths inputted thereto and an amplification ratio of the optical amplification apparatus to thereby generate an output which is dependent on an increase or a decrease of the input power.

To achieve the above objects, the present invention positions an optical power adjusting means which receives inputted light having signal light at a plurality of different wavelengths multiplexed thereon for amplifying or attenuating light at at least one wavelength included in the received light independently of the remaining light at different wavelengths before or after an optical amplifying means for amplifying the light having the signal light at the plurality of different wavelengths multiplexed thereon. Further, a control means is provided for controlling the gain of amplification or attenuation performed by the optical power adjusting means and the gain of amplification performed by the optical amplifier, respectively.

The present invention will be explained below in connection with an example in which the optical power adjusting means is provided before or after the optical amplifying means.

A rare earth added optical fiber or a semiconductor amplifier commonly used as the optical amplifying means has output power dependent on input power on condition that excitation power is constant. This also applies when multiplexed light having light at wavelengths $\lambda_1, \lambda_2, \lambda_3, \ldots, \lambda_N$ multiplexed thereon is simultaneously amplified. Therefore, if the optical amplifying means is driven to increase or decrease the input power of the light at the respective wavelengths, it is possible to produce output power dependent on the increased or decreased input power.

Thus, in the present invention, the optical power adjusting means is positioned before the optical amplifying means. The optical power adjusting means receives light having multiplexed thereon light at a plurality of wavelengths and amplifies or attenuates light at at least one wavelength included in the received light independently of other light at different wavelengths from the wavelength of the light to be amplified or attenuated. The optical power adjusting means adjusts a deviation of optical power between the wavelengths of the light at the respective wavelengths inputted to the optical amplifying means, and thereafter the optical amplifying means simultaneously amplifies the light having the light at the respective wavelengths multiplexed thereon, thereby adjusting the power of the light at the respective wavelengths and the deviation of optical power between the wavelengths to desired values.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Optical amplification apparatuses according to the present invention will hereinafter be described in connection with preferred embodiments thereof.

Figure 2:
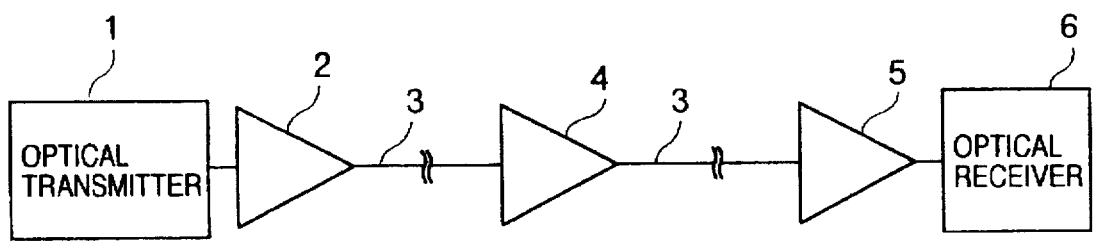
FIG. 2 is a block diagram illustrating an example of the configuration of an optical transmission system according to a first embodiment of the present invention.

First, a first embodiment will be described with reference to FIG. 2 illustrating the configuration of an optical transmission system according to the first embodiment.

The optical transmission system of FIG. 2 comprises an optical transmitter 1 for emitting signal light; an optical booster amplifier 2 for amplifying the power of the emitted signal light; a transmission fiber 3 for transmitting the signal light; an optical relay 4 for amplifying and relaying the signal light; an optical pre-amplifier 5 for amplifying the transmitted signal light; and an optical receiver 6 for receiving the signal light amplified by the optical pre-amplifier 5.

Figure 1:
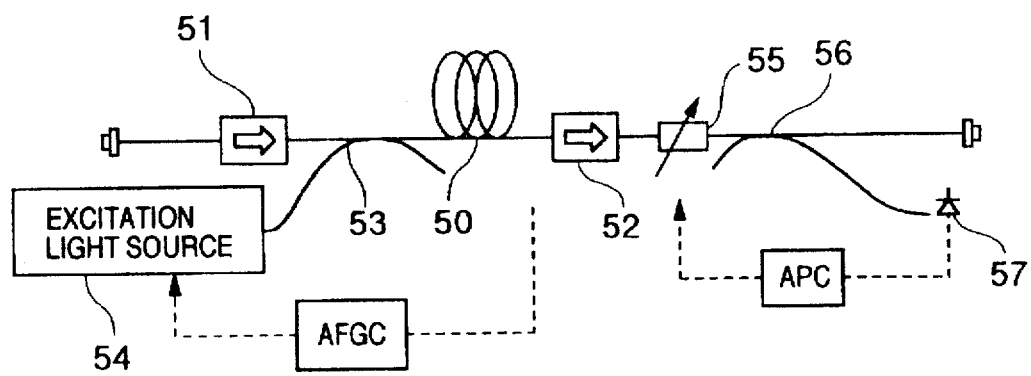
FIG. 1 is a block diagram illustrating the configuration of a conventional optical amplification apparatus.

The optical amplification apparatus according to the first embodiment may be used as the optical booster amplifier 2, the optical relay 4, and the optical pre-amplifier 5 in the optical transmission system illustrated in FIG. 1.

The first embodiment will be described in connection with the optical booster amplifier 2, as representative, implemented by the optical amplifier according to the first embodiment.

Figure 3:
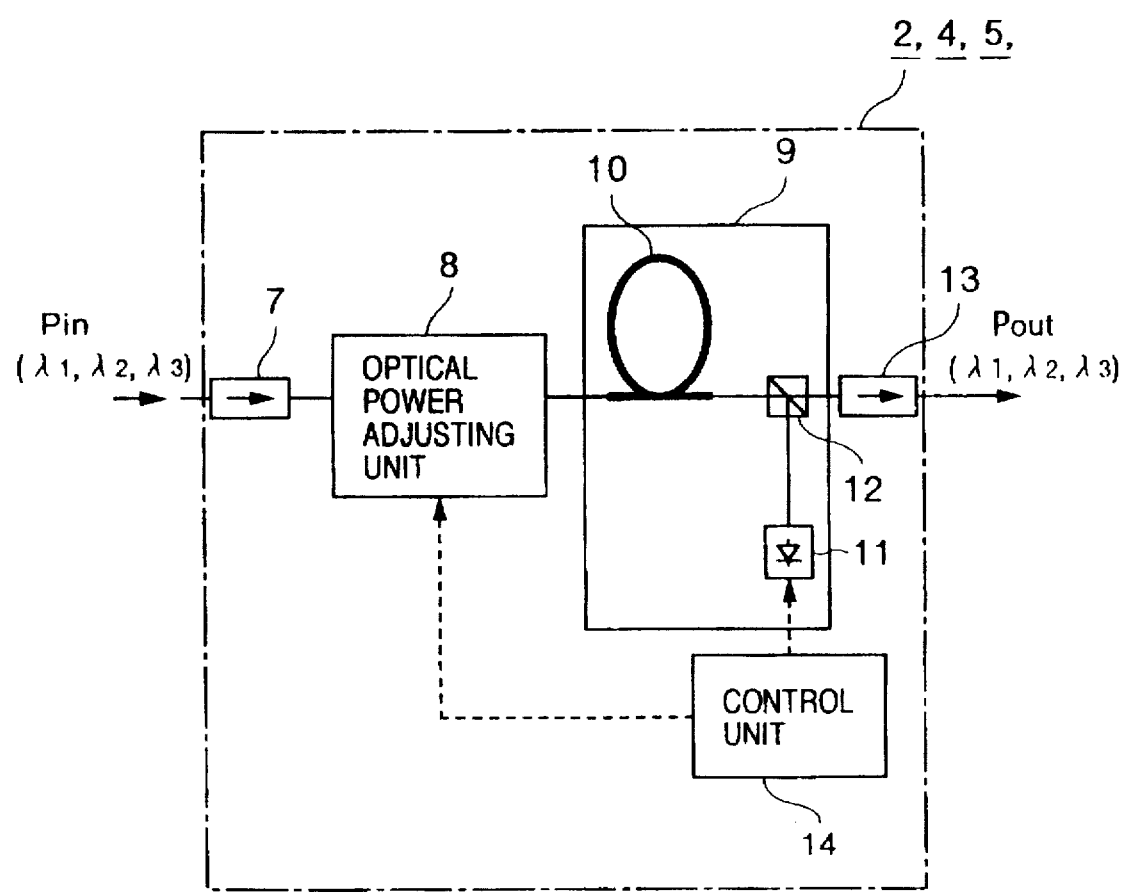
FIG. 3 is a block diagram illustrating the configuration of an optical amplification apparatus according to the first embodiment of the present invention.

FIG. 3 illustrates the configuration of the optical booster amplifier 2. In the first embodiment, the optical booster amplifier 2 is supplied with input signal light Pin having light at three different wavelengths multiplexed thereon from the optical transmitter 1. The three wavelengths are $\lambda_1=1547$ nm (nanometers, $=10^{-9}$ meter), $\lambda_2=1552$ nm and $\lambda_3=1557$ nm in this particular example. As illustrated in FIG. 3, the optical booster amplifier 2 is composed of an optical isolator 7, an optical power adjusting unit 8, an optical amplifier unit 9, an optical isolator 13, and a control unit 14. The optical amplifier unit 9 is composed of a rare earth added optical fiber 10, an excitation light source 11, and a light combiner 12. Used in the first embodiment as the rare earth added optical fiber 10 is an erbium-added optical fiber. Also, as the excitation light source 11, a semiconductor laser having a wavelength at 1480 nm is used in the first embodiment.

In the optical booster amplifier 2, the input signal light Pin is supplied to the optical power adjusting unit 8 through the optical isolator 7. The optical power adjusting unit 8 adjusts the optical power of light at respective wavelengths ($\lambda_1$, $\lambda_2$, $\lambda_3$, ..., $\lambda_N$) as well as a deviation of the optical power between the respective light at the respective wavelengths. Then, the adjusted signal light Pin is outputted to the optical amplifier unit 9.

In the optical amplifier unit 9, excitation light emitted from the excitation light source 11 flows into the erbium-added optical fiber 10 to excite the erbium-added optical fiber 10. Thus, the signal light inputted from the optical power adjusting unit 8 into the erbium-added optical fiber 10 is amplified and outputted to the optical isolator 13 through the light combiner 12. Then, an output signal light Pout having light at wavelengths $\lambda_1$, $\lambda_2$, $\lambda_3$ multiplexed thereon is outputted from the optical isolator 13. Here, the excitation light source 11 is controlled in terms of an excitation light amount by the control unit 14.

It should be noted that the excitation light in the optical amplifier unit 9 may be inputted from a stage before the erbium-added optical fiber 10. In addition, a semiconductor amplifier may be used as the optical amplifier unit 9.

The control unit 14 controls the optical amplifier unit 9 and the optical power adjusting unit 8 adjust the optical output of the optical amplifier unit 9 and a deviation of optical power between the multiplexed wavelengths for each wavelength, as will be described below in detail.

Next, the optical power adjusting unit 8 will be described with reference to FIG. 4 which illustrates the internal configuration of the optical power adjusting unit 8. As illustrated, the optical power adjusting unit 8 comprises light combiner/separator units 15, 16 each for combining signal light at wavelengths $\lambda_1$, $\lambda_2$, $\lambda_3$ and separating combined light into light at the wavelengths $\lambda_1$, $\lambda_2$, $\lambda_3$, and optical gain adjusters 17b, 17c for adjusting the optical power of the light at wavelengths $\lambda_2$, $\lambda_3$. The signal light at wavelength $\lambda_1$ is not adjusted. The light combiner/separator units 15, 16 have a structure including a combination of two 1×3 optical star couplers 18, 19 and optical filters 20a, 20b, 20c. The optical gain adjusters 17b, 17c are composed of rare earth added optical fibers 21b, 21c; excitation light sources 22b, 22c; and light combiners 23b, 23c, respectively. In the first embodiment, light emitting diodes at a wavelength of 820 nm are used as the excitation light sources 22b, 22c and erbium-added optical fibers as the rare earth added optical fibers 21b, 21c.

The deviation of optical power between wavelengths can be relatively set based on light at one wavelength. For example, if the gain of the optical amplifier unit 9 is determined by setting an excitation light amount of the excitation light source 11 such that the optical output power of light at wavelength is +10 dBm, and excitation light amounts of the excitation light sources 22b, 22c in the optical gain adjusters 17b, 17c are adjusted to determine the gains of light at wavelengths $\lambda_2$, $\lambda_3$ in accordance with the setting of the optical amplifier unit 9, the output power of the light at the respective wavelengths and the deviation of optical power between the wavelengths can be arbitrarily adjusted. The control for adjusting the excitation light amounts outputted by the excitation light sources 11, 22b, 22c is performed by the control unit 14.

Figure 4:
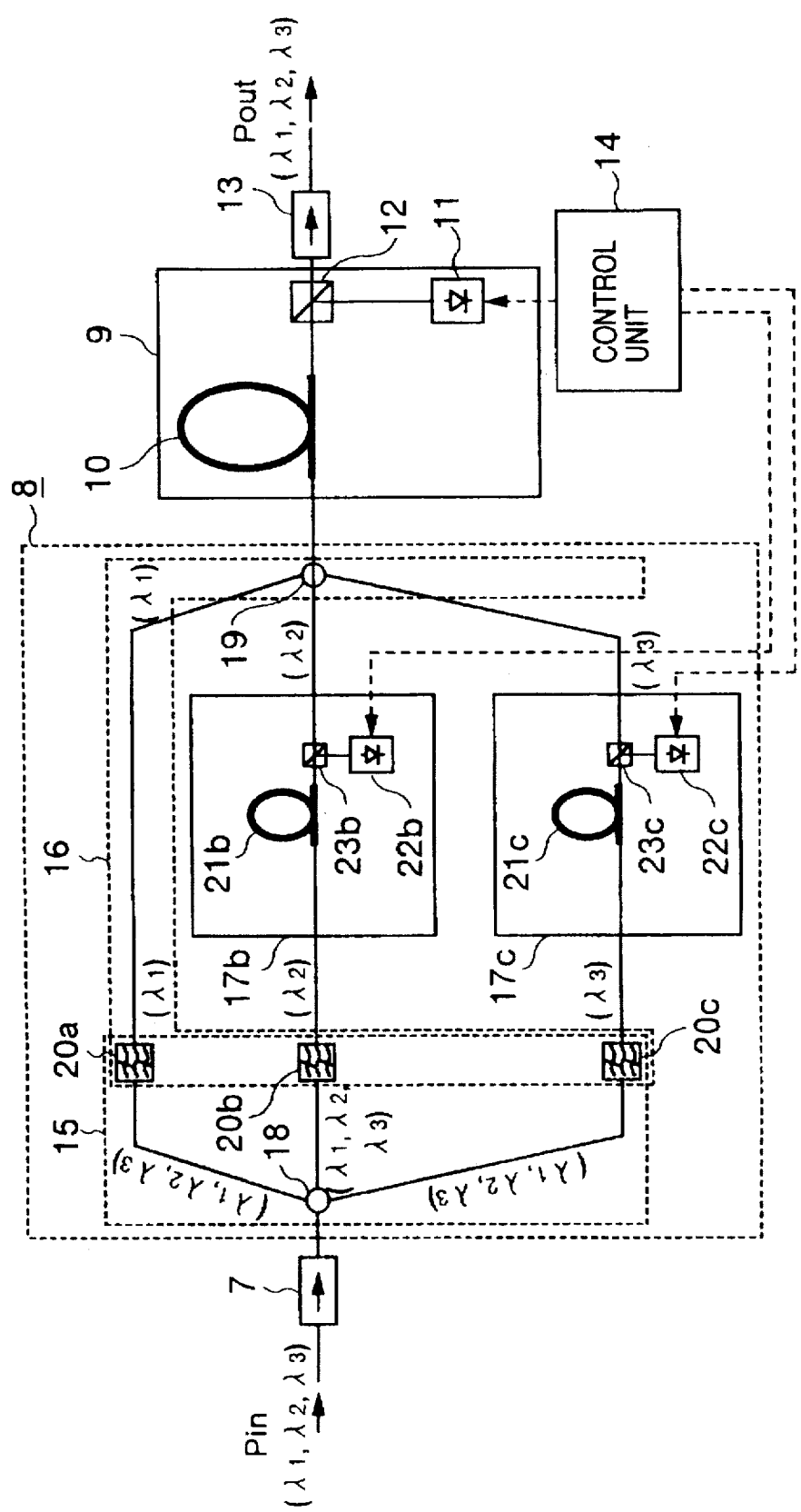
FIG. 4 is a block diagram illustrating a first exemplary configuration of an optical power adjusting unit according to the first embodiment of the present invention.

While FIG. 4 illustrates a configuration of the optical power adjusting unit 8 without optical gain adjuster for the light at wavelength $\lambda_1$, alternatively, the optical power adjusting unit 8 may be provided with an optical gain adjuster for the light at wavelength $\lambda_1$ and not provided with an optical gain adjuster for the light at wavelength $\lambda_2$ or $\lambda_3$.

Also, according to the characteristic of the erbium-added optical fiber 10 used in the first embodiment, there is few deviation of gain between light at 15544 nm and light at 1565 nm. Thus, when wavelengths of 1544 nm and 1565 nm are used as part of wavelengths to be multiplexed on signal light, the gain may be adjusted for the rest of wavelengths by the optical gain adjuster 17 without combination and separation of the wavelengths of 1544 nm and 1565 nm and without adjusting the gains at the wavelengths of 1544 nm and 1565 by the optical gain adjuster 17. In this way, the configuration of the optical power adjusting unit 8 can be simplified.

Next, the operation of the light combiner/separator units 15, 16 in the optical power adjusting unit 8 will be explained with reference to FIG. 5. It should be noted that the illustration of the optical gain adjusters 17b, 17c are omitted in FIG. 5 for clarifying the explanation.

Figure 5:
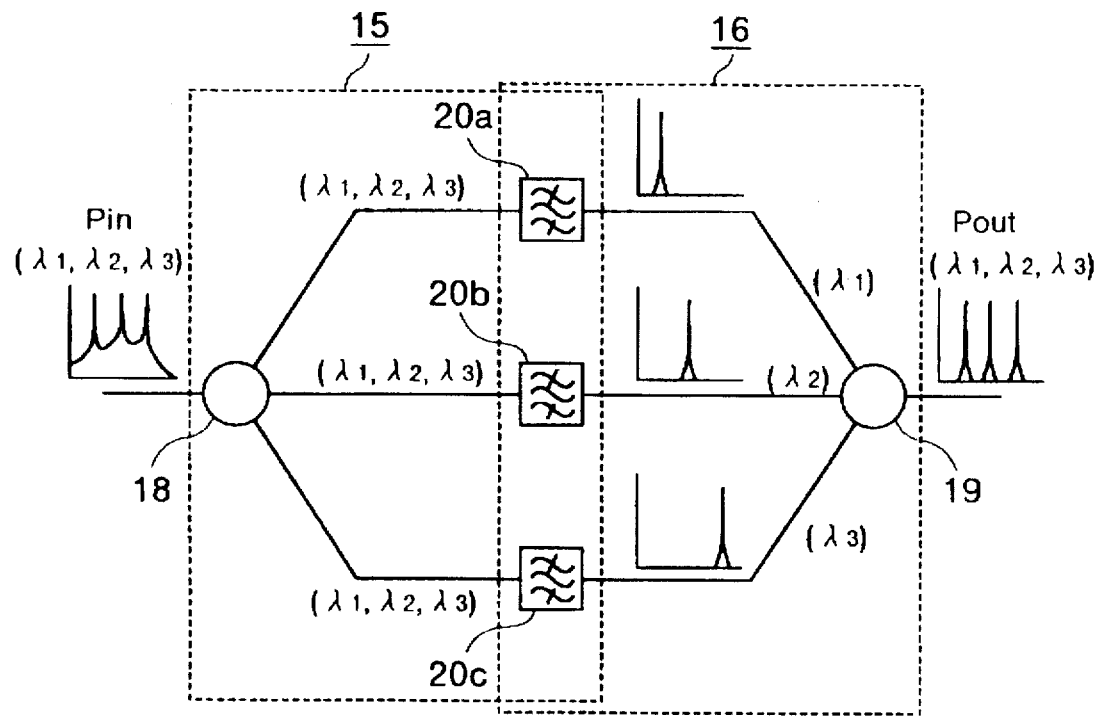
FIG. 5 is a block diagram illustrating the configuration of a light combiner/separator according to the first embodiment of the present invention.

Referring specifically to FIG. 5, signal light Pin inputted to the light combiner/separator units 15, 16 is equally split into three which are supplied to three optical filters 20a–20c. The optical filters 20a–20c output light at wavelengths $\lambda_1$, $\lambda_2$, $\lambda_3$, respectively. Specifically, the optical filter 20a having a pass band of 1547 nm±1 nm passes only light at wavelength $\lambda_1$ (=1547 nm); the optical filter 20b having a pass band of 1552 nm±1 nm passes only light at wavelength $\lambda_2$ (=1552 nm); and the optical filter 20c having a pass band of 1557 nm 1 nm passes only light at wavelength $\lambda_3$ (=1557 nm).

Among the light, the light at wavelengths $\lambda_2$, $\lambda_3$ is adjusted the gains by the optical gain adjusters 17b, 17c, respectively, and combined with the light at wavelength $\lambda_1$ outputted from the optical filter 20a by a 1×3 optical star coupler 19.

The optical filter 20a may be implemented by any low pass filter, for example, one having a wavelength pass band of approximately 1548 nm or less, as long as it blocks light at wavelengths $\lambda_2$, $\lambda_3$. Likewise, the optical filter 20c may be implemented by any high pass filter, for example, one having a wavelength pass band of approximately 1556 nm or more, as long as it blocks light at wavelengths $\lambda_1$, $\lambda_3$.

In the operation mentioned above, the light at three wavelengths respectively suffers from substantially a uniform loss of −5 dB due to the 1×3 optical star coupler 18, and from substantially a uniform loss of −1 dB due to the respective optical filters 20a, 20b, 20c. Further, the light at three wavelengths also suffers from substantially a uniform loss of −5 dB due to the 1×3 optical star coupler 19 at the final stage. Thus, the light at the three wavelengths uniformly undergoes an optical loss amounting to −11 dB. This means that the optical gain adjuster 17 is the only factor inside the optical power adjusting unit 8 which causes a deviation of gain between wavelengths and the remaining optical parts do not contribute to the deviation of gain between wavelengths. It will be understood that if the number of wavelengths of light multiplexed on signal light is increased as $\lambda_1$, $\lambda_2$, $\lambda_3$, $\lambda_4$, ..., $\lambda_N$, the number of branches provided by the star coupler 18, the number of the optical filters 20, and the number of the optical gain adjusters 17 may be correspondingly increased.

Next, the operation of the optical gain adjuster 17 will be explained in detail with reference to FIG. 6.

Since the same components are used for the optical gain adjusters 17b, 17c in the first embodiment, the optical gain adjuster 17b is only explained below.

Figure 6:
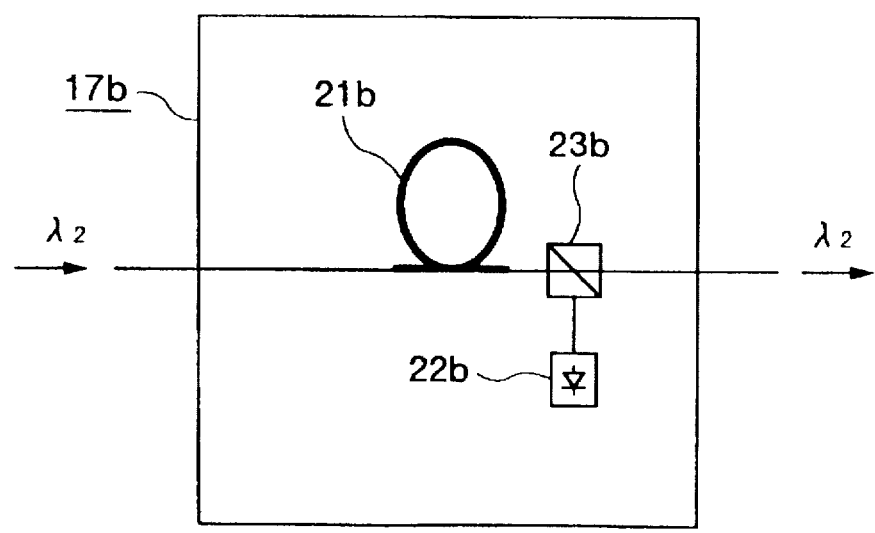
FIG. 6 is a block diagram illustrating the configuration of an optical gain adjuster according to the first embodiment of the present invention.

Excitation light from the excitation light source 22b in FIG. 6 flows into the erbium-added optical fiber 21b at its rear end through the light combiner 23b and excites the erbium-added optical fiber 21b. Light at wavelength $\lambda_2$ is inputted from the front end of the erbium-added optical fiber 21b, subjected to amplification or attenuation in the erbium-added optical fiber 21b, and outputted therefrom. The excitation light source 22b is controlled by the control unit 14. The excitation light may be inputted from a stage before the erbium-added optical fiber 21b. Also, the optical gain adjuster 17b may be implemented by a semiconductor amplifier, in which case an excitation current is controlled by the control unit 14.

Generally, an optical amplification medium used for an optical amplifier acts as a medium for amplifying light when excitation power is flowing thereinto, whereas it acts as a medium for attenuating light if a small amount of excitation power or no excitation power is flowing thereinto. Since the optical gain adjuster 17 according to the first embodiment is composed of the rare earth added optical fiber 21, the excitation light source 22, and the light combiner 23, the optical gain adjuster 17 functions to have a negative gain when a less amount of excitation power is supplied thereto and functions to have a positive gain when a larger amount of excitation power is supplied thereto to enable amplification of light.

Since conventional optical attenuators require external control using a motor or the like, they are disadvantageous in large size and slow control speed. In contrast, the optical gain adjuster 17 of the first embodiment only relies on increase and decrease of the excitation power to adjust optical output power, so that the adjustment of the gain of light, including an attenuation direction, can be simply and instantaneously carried out. Thus, no motor is required for the control. Further, since the amplification wavelength band has a sufficient extent to fully cover the band of multiplexed signal light, the same optical gain adjusters 17 can be used for light at respective wavelengths.

In the first embodiment, the optical gain adjuster 17b is formed of the erbium-added optical fiber 21b which is made of the same material as the erbium-added optical fiber 10 of the optical amplifier unit 9 at a subsequent stage by the following reason.

Specifically, a control speed (approximately 1–5 ms) provided by an excitation light amount from the excitation light source 11 in the optical amplifier unit 9, controlled by the control unit 14 as described above, is substantially determined by a relaxation lifetime when the erbium-added optical fiber 10 of the optical amplifier unit 9 is excited by the excitation light. Likewise, an adjusting speed of the optical gain adjuster 17b is determined by a relaxation lifetime when the erbium-added optical fiber 21a is excited by the excitation light, so that the adjusting speed is substantially the same as the control speed of the optical amplifier unit 9. Thus, the adjustment can be carried out at a high speed equivalent to the control speed provided by the excitation light amount of the excitation light source 11 in the optical amplifier unit 9 controlled by the control unit 14. Moreover, the optical gain adjuster 17b does not perform excessively fast adjustment which would adversely affect signal modulated waveforms. In addition, the wavelength amplification band of the erbium-added optical fiber 10 in the optical amplifier unit 9 can be made completely the same as the wavelength adjusting band of the optical gain adjuster 17b.

For the reason mentioned above, the present inventors think that the rare earth added optical fiber 21b in the optical gain adjuster 17b and the rare earth added optical fiber 10 in the optical amplifier unit 9 at a subsequent stage are preferably made of the same material. However, any other rare earth added optical fibers may be used instead of the erbium-added optical fiber 21b.

The erbium-added optical fiber 21b may have a length of approximately 3 m because an excessive amplification characteristic is not necessary, so that approximately 1/10 is only required for the erbium-added optical fiber 21b as compared with the length of the erbium-added optical fiber 10 used for the optical amplifier unit 9.

The output of the light emitting diode 22b at 830 nm used for the excitation light source 22b may be 20 mW or less. Generally, while high power semiconductor lasers having a wavelength band centered at 980 nm or 1480 nm providing a high gain efficiency are effective when a rare earth added optical fiber is used as an amplifying medium, a light source having a wavelength band of a low gain efficiency or a low power light source is sufficiently applicable to the excitation light source 22b used for the optical gain adjuster 17b. Thus, an applicable range of the excitation light source 22b usable for the optical gain adjuster 17b is quite wide. For example, lower power light sources having a wavelength band near 520 nm, near 660 nm, near 820 nm, near 980 nm, and near 1480 nm may be used for this purpose. Particularly, a light emitting diode having a wavelength band near 830 nm is available at a low price, so that the use of this light emitting diode permits the optical gain adjuster 17b according to the first embodiment to be implemented at a lower cost.

Next, the control unit 14 will be described with reference to FIG. 7. The controller 14 controls an excitation light amount of the excitation light source 11 in the optical amplifier unit 9, and excitation light amounts of the excitation light sources 22b, 22c in the respective optical gain adjusters 17b, 17c in the optical power adjusting unit 8, in order to adjust the optical output and a deviation of power between different wavelengths for each wavelength.

Figure 7:
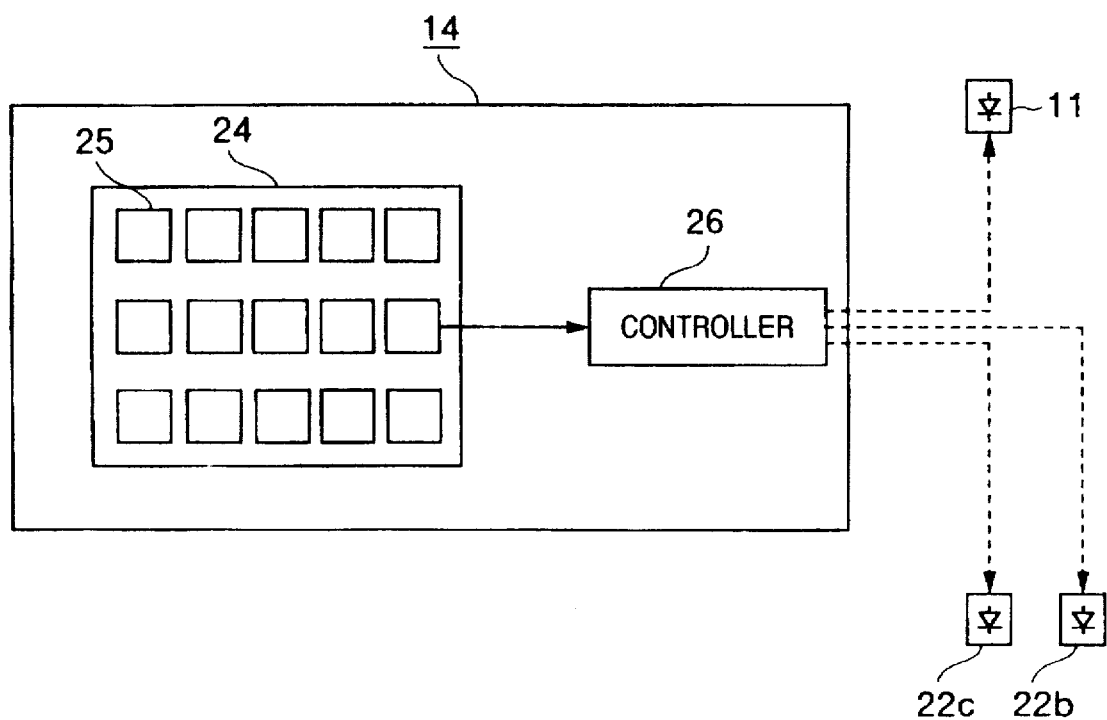
FIG. 7 is a block diagram illustrating a control unit according to the first embodiment of the present invention.

FIG. 7 illustrates the internal configuration of the control unit 14. A memory unit 24 previously has stored several control parameters 25. For example, a plurality of sets of an excitation light amount of 1480 nm semiconductor laser functioning as the excitation light source 11 in the optical amplifier unit 9 and excitation light amounts of 820 nm light emitting diodes functioning as the excitation light sources 22b, 22c internal to the respective optical gain adjusters 17b, 17c are stored in the memory unit 24 as the parameters 25 such that one of these sets is selected by a controller 26 in response to input information from the outside.

The controller 26 controls an excitation light amount of the 1480 nm semiconductor laser serving as the excitation light source 11 in the optical amplifier unit 9 and excitation light amounts of the 820 nm light emitting diodes functioning as the excitation light sources 22b, 22c internal to the respective optical gain adjusters 17b, 17c in response to a selected one of the parameters 25. The parameters 25 are provided for each set of powers at respective wavelengths of input light, so as to be selected by the controller 26 in response to actual input optical power instructed thereto from the outside.

Table 1 shows the control parameters 25 provided for each set of powers at respective wavelengths of input light. According to the control parameters 25, the optical output power can be set to +10 dBm at each wavelength for any combination of power of input light at the respective wavelengths, so that the deviation of output power between the respective wavelengths can be set to 0 dB. In the first embodiment, input power of the optical transmitter 1 provided to the optical booster amplifier 2 is accurately controlled to −2 dBm at either of wavelengths $\lambda_1$, $\lambda_2$, $\lambda_3$ and substantially no fluctuations in input power and no deviation of output power between inputted signal light at the respective wavelengths are found, so that the controller 26 selects the parameters 25 of a shaded column in Table 1.

the former comprises optical gain adjusters 17a, 17b, 17c on paths for all of signal light at $\lambda_1$, $\lambda_2$, $\lambda_3$, respectively. The configuration of FIG. 8 enables optical power at the respective wavelengths to be adjusted completely independent of each other, so that the adjustment accuracy is also improved. In this case, the control parameters 25 stored in the memory

TABLE 1

| Input Power ($\lambda_1, \lambda_2, \lambda_3$) [dBm] | (−2, −2, −1) | (−2, −2, −2) | (−2, −2, −3) | (−2, −1, −1) | (−2, −3, −1) | (−2, −1, −2) | ... |
|---|---|---|---|---|---|---|---|
| Output Power ($\lambda_1, \lambda_2, \lambda_3$) [dBm] | (+10, +10, +10) | (+10, +10, +10) | (+10, +10, +10) | (+10, +10, +10) | (+10, +10, +10) | (+10, +10, +10) | ... |
| Excitation Light Source [mW] (11) | 91 | 95 | 98 | 87 | 94 | 93 | ... |
| Optical Power Adjusters [dB] $\lambda_2$(22b) | −0.7 | 1.0 | +0.8 | −1.6 | 0 | −2.1 | ... |
| Optical Power Adjusters [dB] $\lambda_3$(22c) | −2.3 | 1.5 | −0.3 | −2.1 | −2.5 | −1.6 | ... |

Alternatively, the control parameters 25 may describe the values of currents to be supplied to the excitation light sources 11 and 22. Also alternatively, the control parameters 25 may be previously stored for each combination of power of output light such that the controller 26 selects one in response to a desired combination of power of output light instructed from the outside.

Table 2 shows an example of the control parameters 25 which are set for each combination of power of output light. The use of the control parameters 25 shown in Table 2 provides output light power having an arbitrary deviation between outputs at different wavelengths. The input power of signal light at $\lambda_1$, $\lambda_2$, $\lambda_3$ to the optical amplification apparatus of the optical transmitter 1 in the first embodiment is accurately controlled to −2 dBm so that substantially no fluctuations in input power and no deviation of input power between input light at different wavelengths are found. For maintaining the optical power of signal light at respective wavelengths uniformly to −25 dBm after being transmitted a distance of 120 km under such a condition, the controller 26 may select, for example, parameters 25a indicated by shading in Table 2 so as to cancel a deviation of power between the respective wavelengths caused by the attenuation of power during the transmission. The optical output power at the respective wavelengths may be determined in accordance with a transmission distance and losses possibly caused by the transmission fiber 3 so as to provide an optimal condition.

Also, in this case, the control parameters 25 may represent values of currents to be supplied to the excitation light sources 11 and 22. Further alternatively, the control parameters 25 may be set so as to control converted gains instead of the output power.

Figure 8:
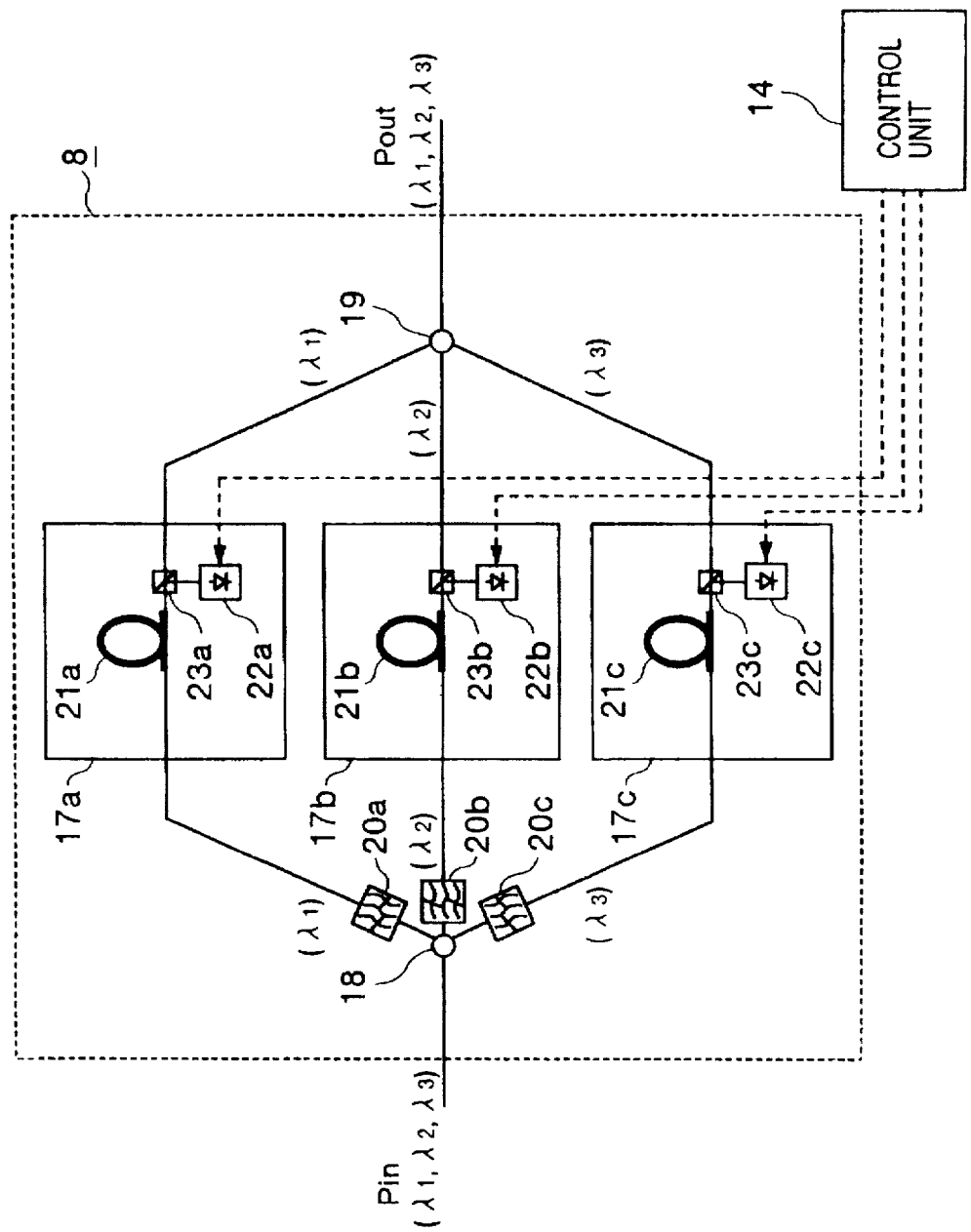
FIG. 8 is a block diagram illustrating a second exemplary configuration of the optical power adjusting unit according to the first embodiment of the present invention.

Alternatively, the optical power adjusting unit 8 may be configured as illustrated in FIG. 8. The configuration illustrated in FIG. 8 differs from that illustrated in FIG. 4 in that unit 14 should include one describing the power of excitation light for wavelength $\lambda_1$ from the excitation light source 22a in the optical gain adjuster 17a. It should be noted that the configuration of FIG. 8 can also support an increased number of multiplexed signal light at different wavelengths such as $\lambda_1$, $\lambda_2$, $\lambda_3$, $\lambda_4$, . . . , $\lambda_N$. Further, in the configuration of FIG. 8, the optical gain adjusters 17a, 17b, 17c may be implemented by semiconductor amplifiers.

Figure 9:
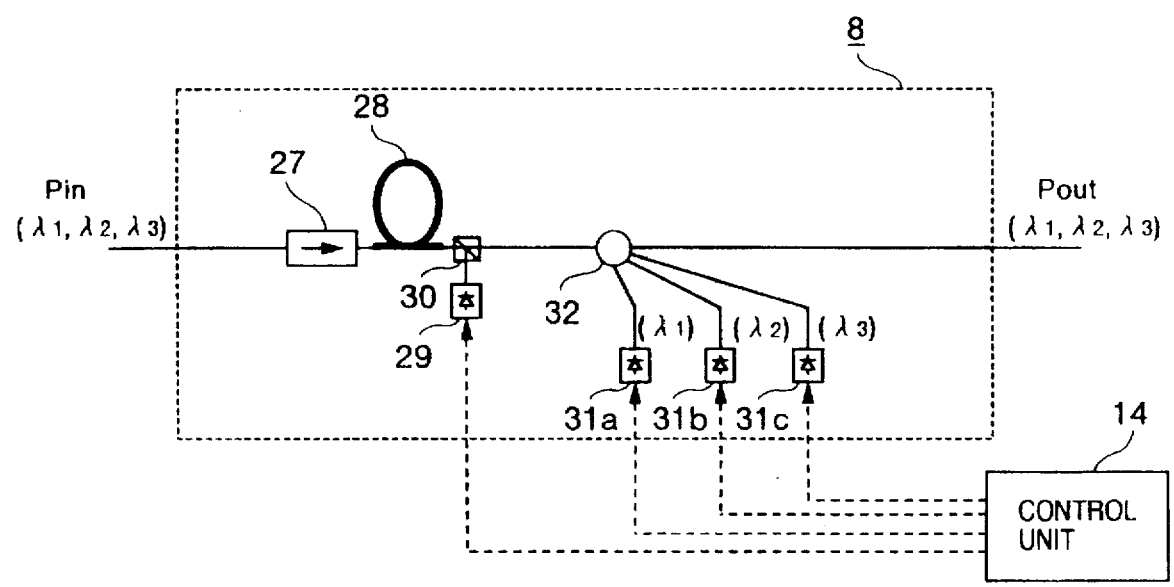
FIG. 9 is a block diagram illustrating a third exemplary configuration of the optical power adjusting unit according to the first embodiment of the present invention.

Further alternatively, the optical power adjusting unit 8 may be configured as illustrated in FIG. 9. Specifically, the optical power adjusting unit 8 illustrated in FIG. 9 comprises an optical isolator 27, a rare earth added optical fiber 28, an excitation light source 29 controlled by the control unit 14, a light combiner 30, light sources 31a, 31b, 31c externally controlled by the control unit 14 to generate light at one or more different wavelengths $\lambda_1$, $\lambda_2$, $\lambda_3$, a 1×4 optical star coupler 32 for combining light from the light sources 31a, 31b, 31c in the direction opposite to the flow of signal light.

The light generated from the light sources 31a, 31b, 31c is in the same wavelength band as that of the multiplexed signal light. With this configuration, if optical power of signal light at a certain wavelength is larger than other signal light at different wavelengths, the optical output of the light source 31 emitting light in the same wavelength band as the signal light is increased to consume amplification energy within the rare earth added optical fiber 28, whereby the amplification ratio of the signal light at the wavelength can be reduced. Conversely, if optical power of an signal light at a certain wavelength is smaller than others, the optical output of the light source 31 emitting light in the same wavelength band as this signal light is decreased to keep amplification energy within the rare earth added optical fiber 28, whereby the amplification ratio of the signal light at the wavelength can be increased.

In the configuration illustrated in FIG. 9, the light from the light source 31 is incident in the direction opposite to the

TABLE 2

| Input Power ($\lambda_1, \lambda_2, \lambda_3$) [dBm] | (−2, −2, −2) | (−2, −2, −2) | (−2, −2, −2) | (−2, −2, −2) | (−2, −2, −2) | (−2, −2, −2) | ... |
|---|---|---|---|---|---|---|---|
| Output Power ($\lambda_1, \lambda_2, \lambda_3$) [dBm] | (+10, +10, +9) | (+10, +10, +10) | (+9.8, +10, +11) | (+10.5, +10.7, 9.8) | (+10, +10.5, 9.8) | (+10.2, 9.8, +10.5) | ... |
| Excitation Light Source [mW] (11) | 91 | 95 | 98 | 87 | 94 | 93 | ... |
| Optical Power Adjusters [dB] $\lambda_2$(22b) | −0.7 | −1.0 | +0.8 | −1.6 | 0 | −2.1 | ... |
| Optical Power Adjusters [dB] $\lambda_3$(22c) | −2.3 | −1.5 | −0.3 | −2.1 | −2.5 | −1.6 | ... | flow of the signal light in order to prevent the light from the light source 31 from mixing with the signal light. Also, the optical isolator 27 is arranged before the rare earth added optical fiber 28 to block the light from the light source 31 amplified in the rare earth added optical fiber 28 and directing in the opposite direction, thus preventing parts arranged before the optical power adjusting unit 8 from being affected by the light from the light source 31. The configuration illustrated in FIG. 9 also uses an erbium-added optical fiber for the rare earth added optical fiber 28 and a 830 nm semiconductor laser for the excitation light source 29. Then, the controller 26 selects a set of control parameters 25 as shown in Table 3 in order to set optical outputs at +10 dBm for respective wavelengths and a deviation of output power between wavelengths at 0 dB.

TABLE 3

| Input Power ($\lambda_1, \lambda_2, \lambda_3$) [dBm] | | (−2, −2, −2) |
|---|---|---|
| Output Power ($\lambda_1, \lambda_2, \lambda_3$) [dBm] | | (+10, +10, +10) |
| Excitation Light Source [mW] (11) | | 95 mW |
| Optical Power Adjusters [dB] | Excitation Light Source [mW] (29) | 30 mW |
| | Light Source $\lambda_1$ (31a) | 0 mW |
| | Light Source $\lambda_2$ (31b) | 5 mW |
| | Light Source $\lambda_3$ (31c) | 7 mW |

It should be noted that also in this configuration, the control parameters 25 may be the values of currents applied to the excitation light sources 11, 22 and to the light sources 31a, 31b, 31c. Further, portions of the light combiner 30, the erbium-added optical fiber 28 and the excitation light source 29 may be replaced with semiconductor amplifiers.

Next, a second embodiment of the optical amplification apparatus according to the present invention will be described below. The optical amplification apparatus according to the second embodiment may also be used as the optical booster amplifier 2, the optical relay 4, and the optical pre-amplifier 5 in the optical transmission system illustrated in FIG. 2.

Figure 10:
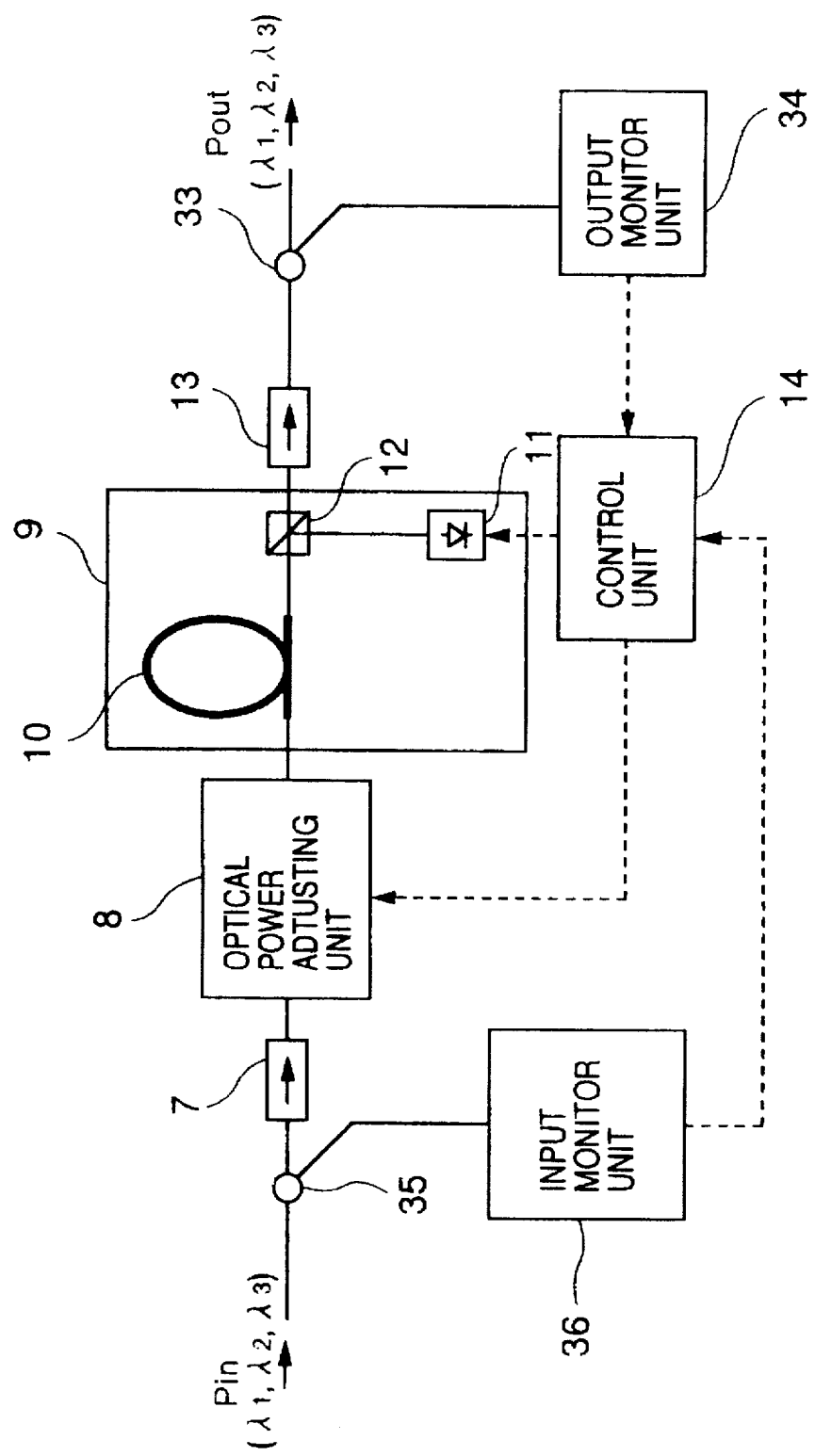
FIG. 10 is a block diagram illustrating a general configuration of an optical amplification apparatus according to a second embodiment of the present invention.

FIG. 10 illustrates the configuration of the optical amplification apparatus according to the second embodiment. The configuration of the optical amplification apparatus according to the second embodiment differs from the configuration of the optical amplification apparatus according to the first embodiment (see FIG. 3) in that the former further comprises a light splitter 33 for splitting part of an optical output; an output monitor unit 34 for detecting power of light at wavelengths $\lambda_1, \lambda_2, \lambda_3$ included in light split by the light splitter 33 or a deviation of power between these wavelengths; a light splitter 35 for splitting part of inputted light; and an input monitor unit 36 for detecting power of light at wavelengths $\lambda_1, \lambda_2, \lambda_3$ included in light split by the light splitter 35 or a deviation of power between these wavelengths. Also, in the second embodiment, the control unit 14 automatically controls respective optical gain adjusters 17 in the optical power adjusting unit 8 and the excitation light source 11 in the optical amplifier unit 9 in response to power of light at the respective wavelengths or a deviation of power between the wavelengths detected at least one of the output monitor unit 34 and the input monitor unit 36 such that the power of the light at the respective wavelengths included in output light or the deviation of power between the wavelengths reaches a predetermined value.

According to the configuration described above, even if input power to the optical amplification apparatus, output power and/or a conversion gain exhibit fluctuations, the optical output power at respective wavelengths and the deviation of power between the wavelengths can be automatically controlled to respective predetermined values. Also, even if light at any wavelength only fluctuates, the output power of the fluctuating light at the wavelength can be controlled to a predetermined value without affecting the output power of light at the remaining wavelengths. Further, the excitation light source 11 in the optical amplifier unit 9 or the like suffers from aging changes, the optical output power at the respective wavelengths and the deviation of power between the wavelengths can be always maintained at a predetermined value, thus making it possible to improve the stability and reliability of the entire optical amplifier.

It should be noted that among the light splitter 33, the output monitor unit 34, the light splitter 35 and the input monitor unit 36 newly proposed in the second embodiment, either a combination of the light splitter 33 and the output monitor unit 34 or a combination of the light splitter 35 and the input monitor unit 36 may only be provided for the operation mentioned above.

In the following, the second embodiment will be described for the case where a combination of the light splitter 33 and the output monitor unit 34 are only chosen from among the light splitter 33, the output monitor unit 34, the light splitter 35 and the input monitor unit 36 newly proposed in the second embodiment.

Figure 11:
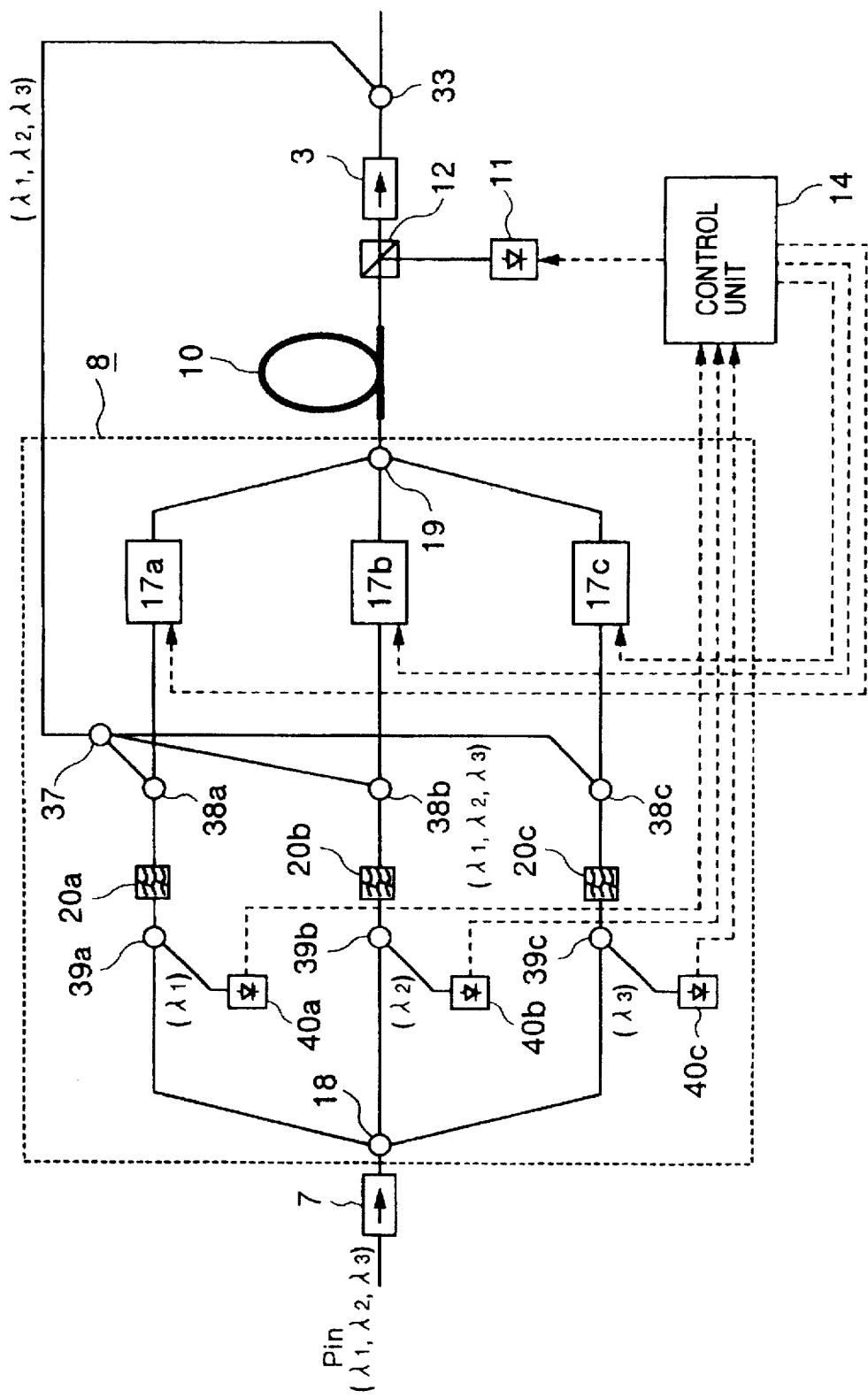
FIG. 11 is a block diagram illustrating a first exemplary configuration of the optical amplification apparatus according to the second embodiment.

FIG. 11 illustrates in greater detail the optical amplification apparatus of the case mentioned above.

Referring specifically to FIG. 11, the output monitor unit 34 is composed of a 1×3 optical star coupler 37; optical couplers 38a, 38b, 38c; optical filters 20a, 20b, 20c; optical couplers 39a, 39b, 39c; and optical detectors 40a, 40b, 40c. The optical filters 20a, 20b, 20c in FIG. 11 are identical to the optical filters 20a, 20b, 20c illustrated in FIG. 4. In other words, the optical filters 20a, 20b, 20c are also used as part of the output monitor unit 34. The remaining parts in FIG. 11 are identical to those denoted by the same reference numerals in FIG. 4.

In the configuration mentioned above, monitor light split from part of an output by the light splitter 33 formed of an optical coupler is again split by the 1×3 star coupler 37, and enters through the optical couplers 38a, 38b, 38c in the direction opposite to the flow of signal light within the optical power adjusting unit 8. The entering light is passed through associated optical filters 20a, 20b, 20c corresponding to respective wavelengths to extract light at the respective wavelengths. Then, the extracted light on each path is partially split by the associated optical coupler 39a, 39b or 39c. The power of the split light at the respective wavelengths is detected by the optical detectors 40a, 40b, 40c, respectively, and notified to the control unit 14.

As will be understood from the foregoing, the optical filters 20a, 20b, 20c in the configuration illustrated in FIG. 11 perform a function of extracting necessary wavelength components from monitor light and a function of separating input light into respective wavelength components. The latter function has also been carried out in the first embodiment. Since no additional optical filters are required for the output monitor unit 34, the configuration can be simplified.

Also, in the configuration illustrated in FIG. 11, since the monitor light split from output light is inputted to the optical fibers connected to the optical filters 20a, 20b, 20c before the optical gain adjusters 17a, 17b, 17c, the monitoring light will not be affected by the optical gain adjusters 17a, 17b, 17c. On the other hand, since the monitor light is entered in the direction opposite to input light directing to the optical gain adjusters 17a, 17b, 17c, the monitor light does not adversely affect the input light in spite of the fact that the monitor light passes through the same optical fibers as the input light does. Also, in this configuration, the optical coupler 33 is arranged after the optical isolator 13 to prevent input light split by the optical power adjuster 8 from flowing through the optical coupler 33 back into the erbium-added optical fiber 10.

As described above, the output monitor unit 34 can be realized by a simple configuration as illustrated in FIG. 11. In addition, this configuration can be extended by increasing the number of branches of the 1×3 optical star coupler 37 even if the number of wavelengths of light multiplexed on signal light is increased as $\lambda_1, \lambda_2, \lambda_3, \lambda_4, \ldots$.

Figure 12:
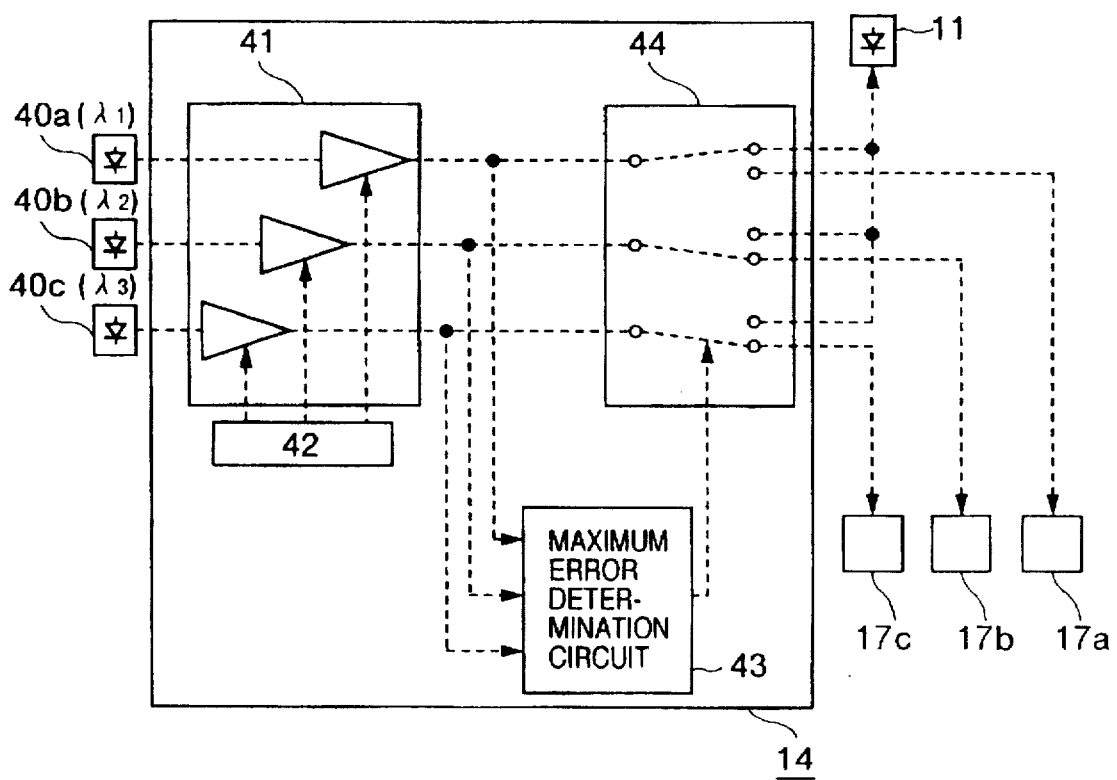
FIG. 12 is a block diagram illustrating the configuration of a control unit in the first exemplary configuration of the optical amplification apparatus according to the second embodiment of the present invention.

Next, FIG. 12 illustrates in detail the configuration of the control unit 14 in the second embodiment. The control unit 14 comprises optical detectors 40a, 40b, 40c; a comparator circuit 41; a circuit 42 for providing a predetermined reference value; a maximum error determination circuit 43; a selector circuit 44; an excitation light source 11; and optical gain adjusters 17a, 17b, 17c.

In the illustrated configuration, the comparator circuit 41 compares optical power at respective wavelengths detected by the optical detectors 40a, 40b, 40c with a reference value provided by the circuit 42 to output errors therebetween. The maximum error determination circuit 43 determines the wavelength at which the largest error is detected. Then, the selector circuit 44 controls to transmit the largest error at the wavelength to the excitation light source 11 as well as to transmit errors at the remaining wavelengths to the optical gain adjusters corresponding to the respective wavelengths (17b, 17c in FIG. 12). In this way, the control unit 14 can control the excitation light source 11 such that optical power at the wavelength at which the largest error has been detected among the detected optical power at the respective wavelengths reaches a predetermined value, and can also control simultaneously the optical gain adjusters corresponding to the respective wavelengths (17b, 17c in FIG. 2) such that optical power at each of the remaining wavelengths reaches the predetermined value. Also, an optical gain adjuster which is not supplied with an error (17a in FIG. 12) provides a corresponding wavelength with a gain so as to always minimize an optical loss. Here, the circuit 42 previously sets the reference value in such a manner that an error indicates a shortage of excitation power.

According to the configuration described above, the power of the excitation light source 11 in the optical amplifier unit 9 is increased, only when optical power at a certain wavelength does not reach the predetermined value even if an optical loss caused by the optical gain adjuster 17 is minimized. It is therefore possible to prevent an excessive input of the excitation power. In addition, by simultaneously controlling optical gain adjusters for wavelengths at which the largest error is not present (17b, 17c in FIG. 12), the excitation power can be made sufficient for any wavelength. This results in reducing power consumption and improving the reliability in the entire optical amplifier.

Figure 13:
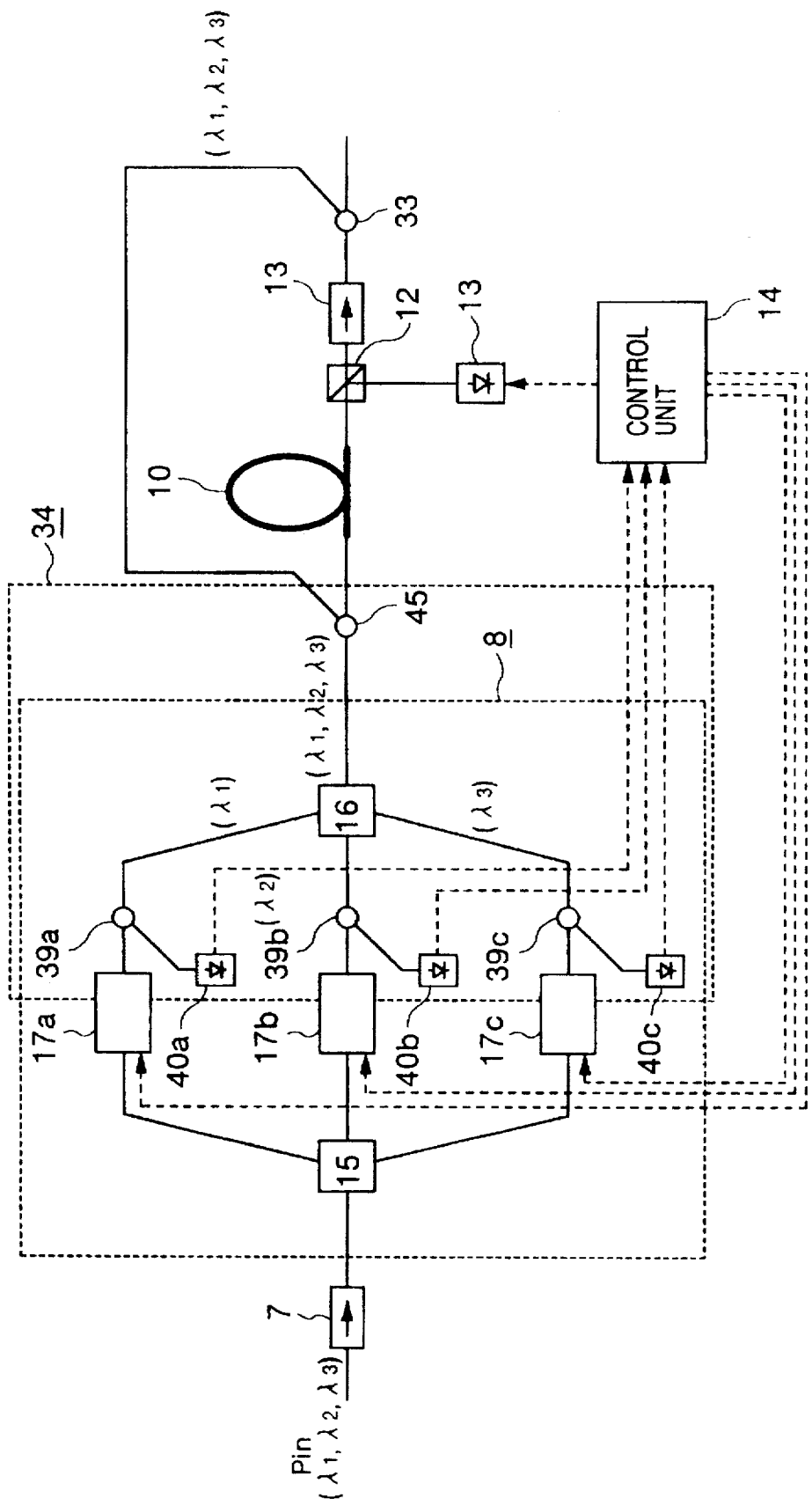
FIG. 13 is a block diagram illustrating a second exemplary configuration of the optical amplification apparatus according to the second embodiment.

In the alternative, the light splitter 33 and the output monitor unit 34 illustrated in FIG. 11 may be modified as shown in FIG. 13.

Specifically, in FIG. 13, the output monitor unit 34 is composed of optical couplers 39a, 39b, 39c; light receivers 40a, 40b, 40c; an optical coupler 45; and light combiner/separator units 15, 16. The light combiner/separator units 15, 16 have the same configurations as those illustrated in FIG. 5. However, the light combiner/separator units 15, 16 in the second embodiment do not share the optical filters 20a, 20b, 20c as in FIG. 5, and instead, a set of optical filters 20a, 20b, 20c is provided for each of the light combiner/separator units 15, 16.

In the configuration illustrated in FIG. 13, part of an optical output is split by an optical coupler 33 serving as a light splitter and inputted through the optical coupler 45 before the erbium-added optical fiber 10 in the direction opposite to the flow of input light. However, in this configuration, the light combiner/separator unit 16 in the optical power adjusting unit 8 is designed to combine light at respective wavelengths adjusted by the optical gain adjusters 17a, 17b, 17c as well as to separate light inputted in the direction opposite to the flow of signal light into light at the respective wavelengths $\lambda_1, \lambda_2, \lambda_3$.

Light is separated by the light combiner/separator unit 16 into light components at the respective wavelengths which are then split by the optical couplers 39a, 39b, 39c, respectively, to detect the power thereof by the associated light receivers 40a, 40b, 40c.

In the configuration described above, the light combiner/separator unit 16 is shared by the optical power adjusting unit 8 and the output monitor unit 34, so that the output monitor unit 34 can be implemented by a less number of components. Since the monitor light is inputted in the direction opposite to the flow of signal light, the monitor light does not adversely affect the input light in spite of the fact that the monitor light passes through the same optical fibers as the input light does. Also, the optical coupler 33 is arranged after the optical isolator 13 to prevent input light split by the optical power adjuster 8 from flowing through the optical coupler 33 back into the erbium-added optical fiber 10. Further, a similar configuration may be used to cope with an increased number of multiplexed wavelengths such as $\lambda_1, \lambda_2, \lambda_3, \lambda_4, \ldots$.

Figure 14:
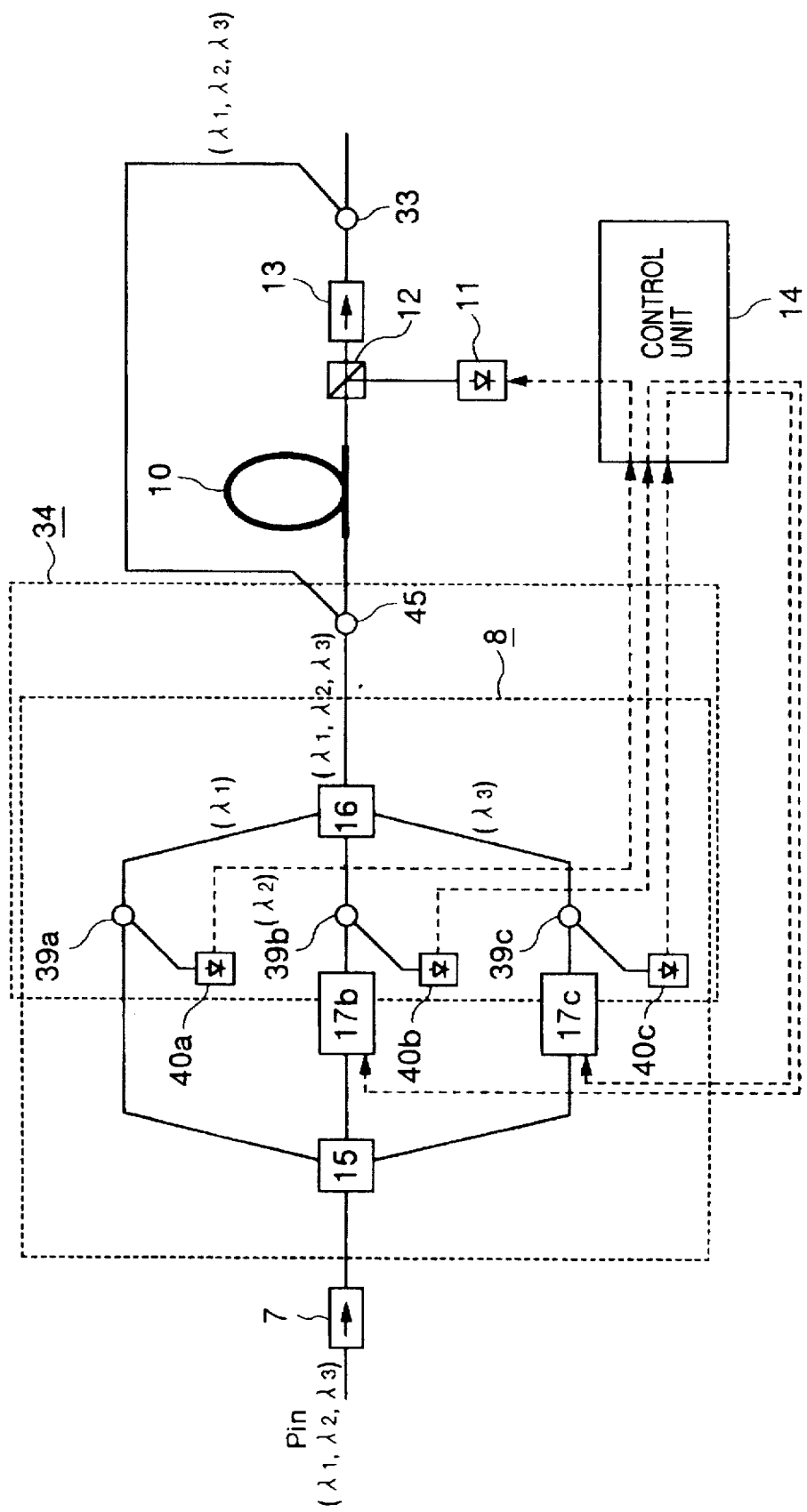
FIG. 14 is a block diagram illustrating a third exemplary configuration of the optical amplification apparatus according to the second embodiment.

Alternatively, if a light path corresponding to an arbitrary wavelength is not provided with the optical gain adjuster 17 as illustrated in FIG. 4 (the light path for wavelength is not provided with the optical gain adjuster), the optical amplification apparatus of FIG. 13 may be configured as illustrated in FIG. 14. The configuration illustrated in FIG. 14 differs from the configuration illustrated in FIG. 13 in that one optical gain adjuster 17 is omitted from the optical power adjusting unit 8. In this configuration, the control unit 14 controls the excitation light source 11 in the optical amplifier unit 9 by detecting the power of monitor light which is split from light at a wavelength passing through the light path on which no optical gain adjuster 17 is provided. Light at the remaining wavelengths may be controlled by adjusting the associated optical gain adjusters 17b, 17c.

The foregoing configuration allows a reduction in the number of components required for the optical amplification apparatus. In addition, the control performed by the control unit 14 can be made simpler.

Figure 15:
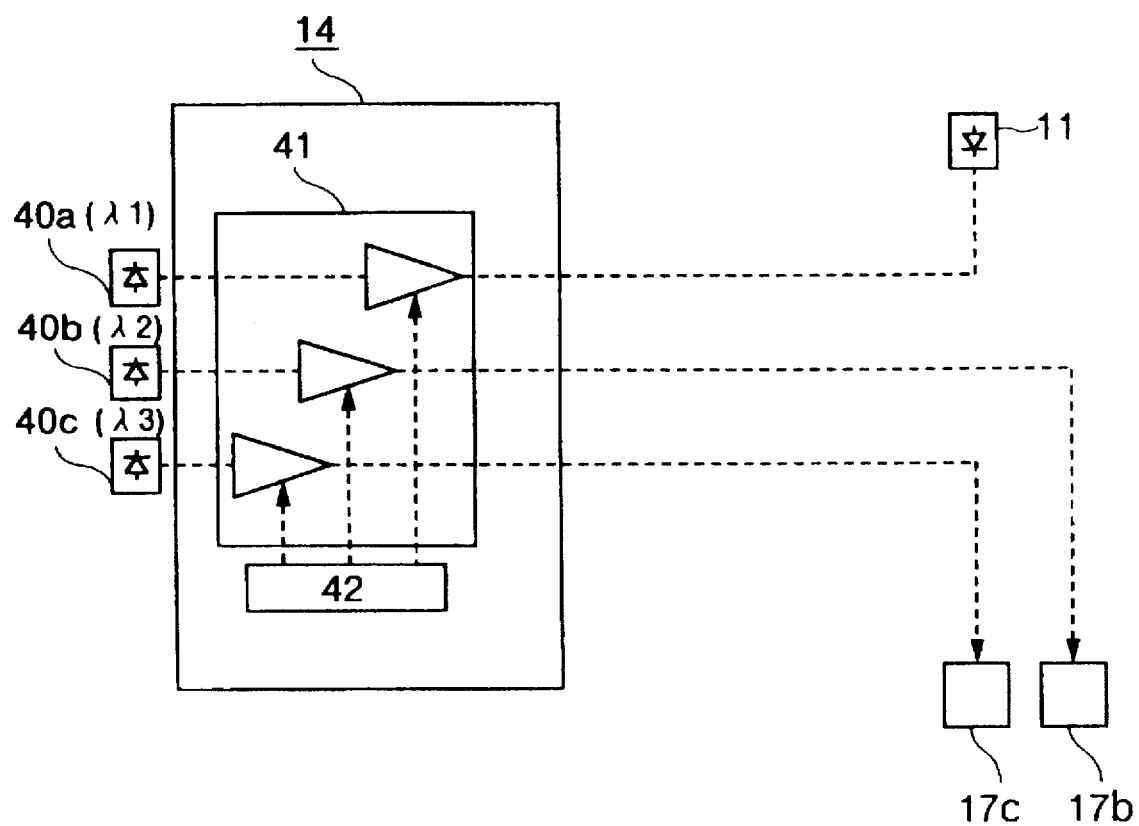
FIG. 15 is a block diagram illustrating a control unit in a first exemplary configuration of an optical amplification apparatus according to a third embodiment of the present invention.

The configuration of the control unit 14 for use in the optical amplification apparatus configured as shown in FIG. 14 is illustrated in FIG. 15. The control unit 14 in FIG. 15 comprises optical detectors 40a, 40b, 40c; a comparator circuit 41; a circuit 42 for providing a predetermined reference value; an excitation light source 11; and optical gain adjusters 17b, 17c. The reference value provided by the circuit 42 is determined such that a control amount outputted from the comparator circuit 41 for the excitation light source 11 in the optical amplifier unit 9 forces the optical amplifier unit 9 to adjust the power of light at the wavelength passing through the light path, on which no optical gain adjuster 17 is provided, to a predetermined level. Also, the reference value provided by the circuit 42 is determined such that the comparator circuit 42 supplies the optical gain adjusters 17b, 17c with a control amount for adjusting the power of light at the remaining wavelengths to a predetermined level. In other words, the power of the light at the wavelength passing through the light path on which no optical gain adjuster 17 is provided is adjusted by increasing or decreasing the power of the excitation light source 11, while the power of the light at the wavelengths passing through the light paths on which the optical gain adjuster 17b, 17c are respectively provided is adjusted by increasing or decreasing an adjustment amount of the optical gain adjusters 17b, 17c, respectively.

Next, a third embodiment of the present invention will be described with reference to FIG. 16. The third embodiment is related to an optical amplification apparatus applicable to the optical relay 4 or the optical pre-amplifier 5 illustrated in FIG. 2.

Figure 16:
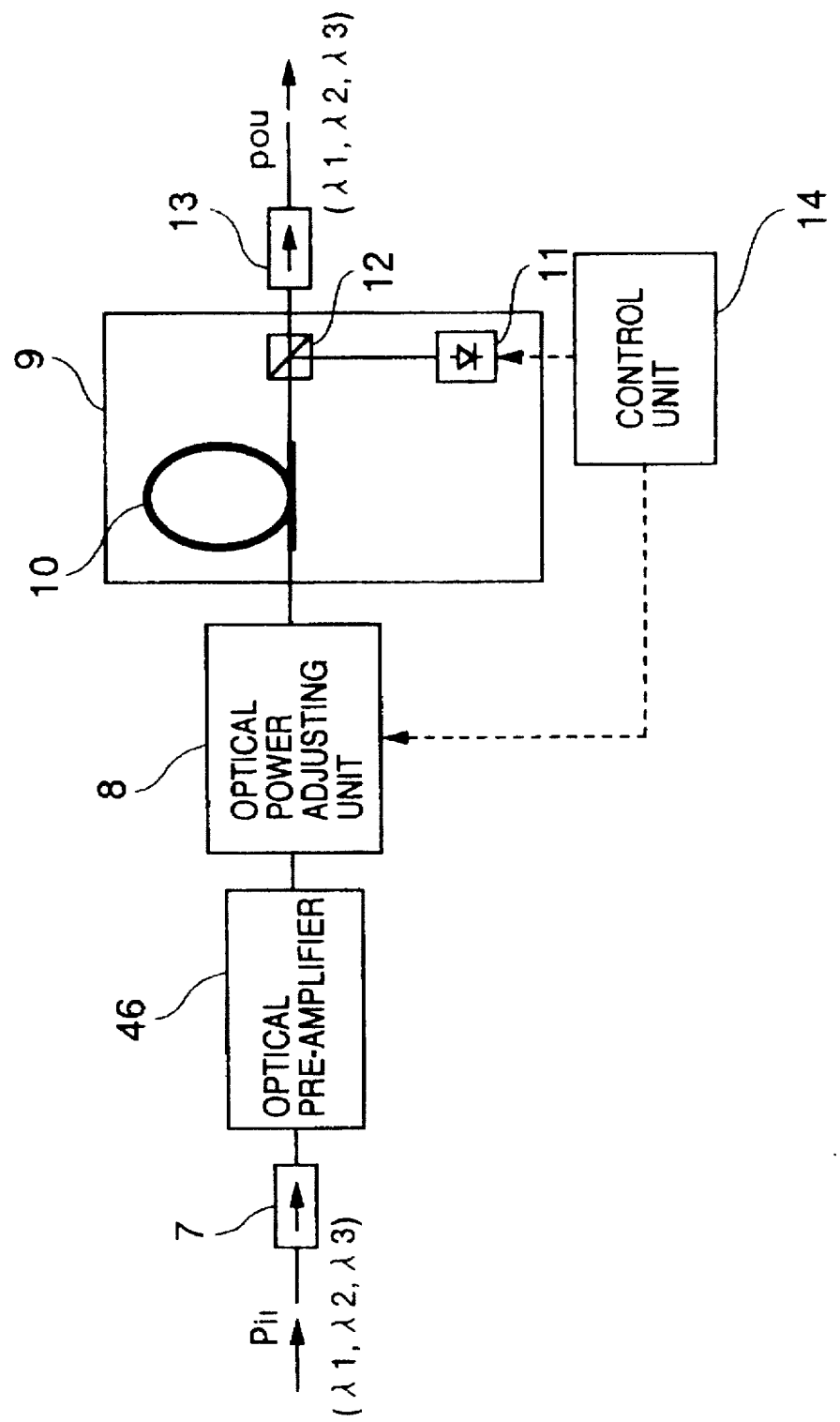
FIG. 16 is a block diagram illustrating the configuration of the optical amplification apparatus according to the third embodiment of the present invention.

FIG. 16 illustrates the configuration of the optical amplification apparatus according to the third embodiment. As illustrated, the optical amplification apparatus according to the third embodiment differs from the optical amplification apparatus according to the second embodiment in that an optical pre-amplifier 46 is additionally provided before the optical power adjusting unit 8. The optical amplification apparatus of the third embodiment is intended to prevent a deteriorated S/N (signal-to-noise) ratio of the entire optical amplifier as well as to prevent a deteriorated S/N ratio of the entire optical transmission system.

Figure 17:
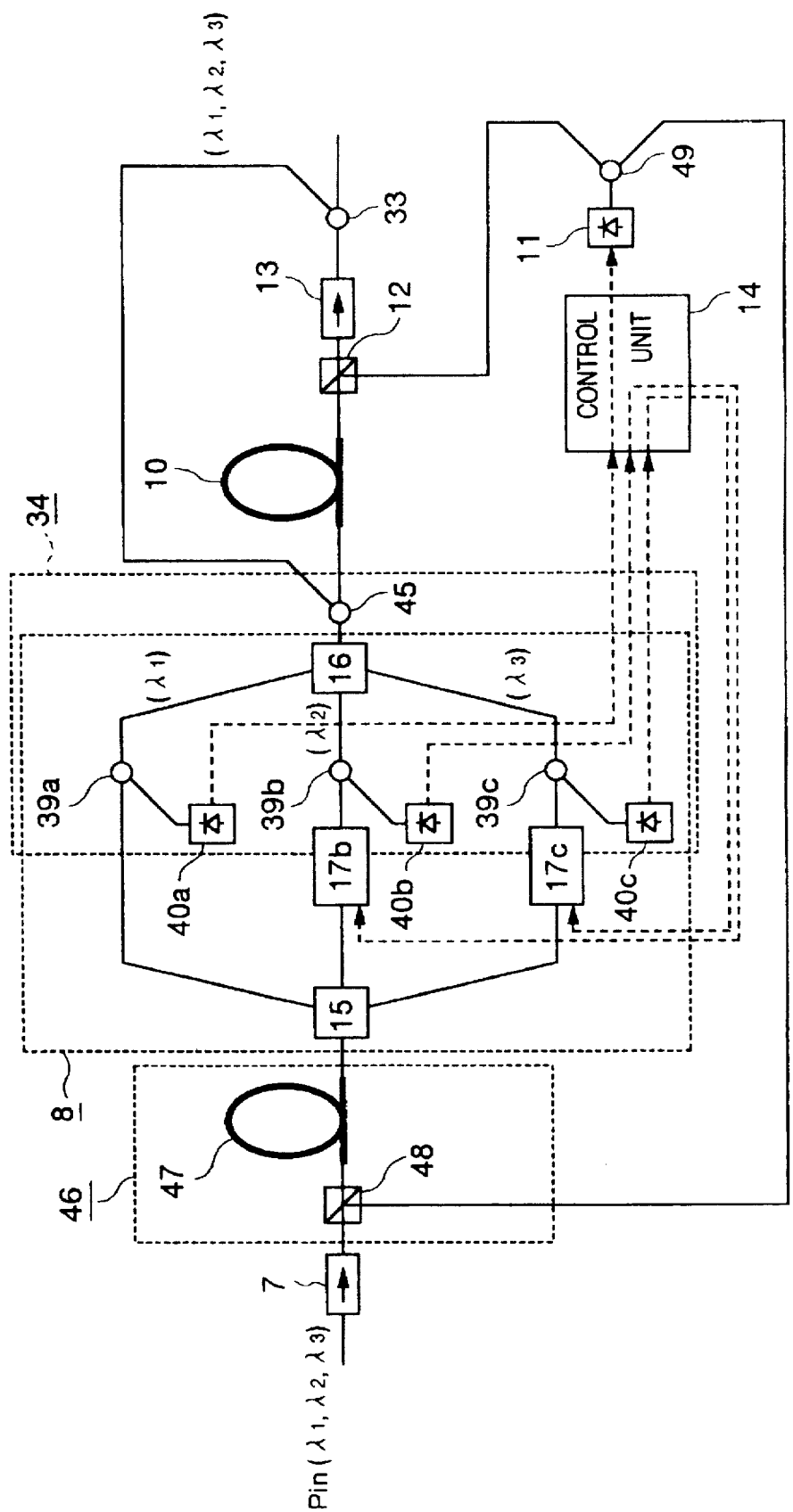
FIG. 17 is a block diagram illustrating in detail the configuration of the optical amplification apparatus according to the third embodiment of the present invention.

FIG. 17 illustrates in greater detail the optical amplification apparatus according to the third embodiment. In FIG. 17, the configurations of the output monitor unit 34 and the optical power adjusting unit 8 are identical to those in the optical amplification apparatus illustrated in FIG. 14.

The optical pre-amplifier 46 is composed of an erbium-added optical fiber 47 and a light combiner 48. An optical coupler 49 performs a function of splitting excitation light from the excitation light source 11 and inputting the split light to the erbium-added optical fiber 11 in the optical amplifier unit 9 to excite the erbium-added optical fiber 11 as well as a function of inputting the split light to an erbium-added optical fiber 47 in the optical pre-amplifier 46 to excite the erbium-added optical fiber 47.

In this configuration, the split ratio of the optical coupler 49 is set to 20: 80, where the optical pre-amplifier 46 is coupled to a 20% branch while the optical amplifier unit 9 to an 80% branch. For example, if light at wavelength $\lambda_1$ suffers a loss of −5 dBm in the optical power adjusting unit 8, amplification of approximately 18 dB in the optical pre-amplifier 46 will reduce deterioration of the S/N ratio in the entire optical amplification apparatus by approximately 60%. In addition, since the optical pre-amplifier 46 in this configuration simultaneously amplifies light at wavelengths $\lambda_1$, $\lambda_2$, $\lambda_3$, deterioration of the S/N ratio in the light at wavelength $\lambda_1$ and deterioration of the S/N ratio in the light at wavelength $\lambda_2$ are simultaneously reduced by approximately 62% and approximately 65%, respectively.

Generally, in optical amplifiers, optical noise components called "naturally emitted light" are generated at wavelengths other than those of signal light, simultaneously with amplification of the signal light. The naturally emitted light may cause deterioration of the S/N ratio of the entire optical amplifier. However, in the third embodiment, the optical filters 20 extract only light near wavelengths of associated signal light, the naturally emitted light components entering simultaneously with the signal light at wavelengths $\lambda_1$, $\lambda_2$, $\lambda_3$ from a stage before the optical power adjusting unit 8 are removed by the optical filters 20. Therefore, according to the configuration illustrated in FIG. 17, the deterioration of the S/N ratio as the entire optical amplification apparatus is prevented from a viewpoint of removing the optical noise components.

Next, a fourth embodiment of the present invention will be described with reference to FIG. 18. The fourth embodiment is related to an optical amplification apparatus applicable to the optical relay 4 or the optical pre-amplifier 5 illustrated in FIG. 2.

Figure 18:
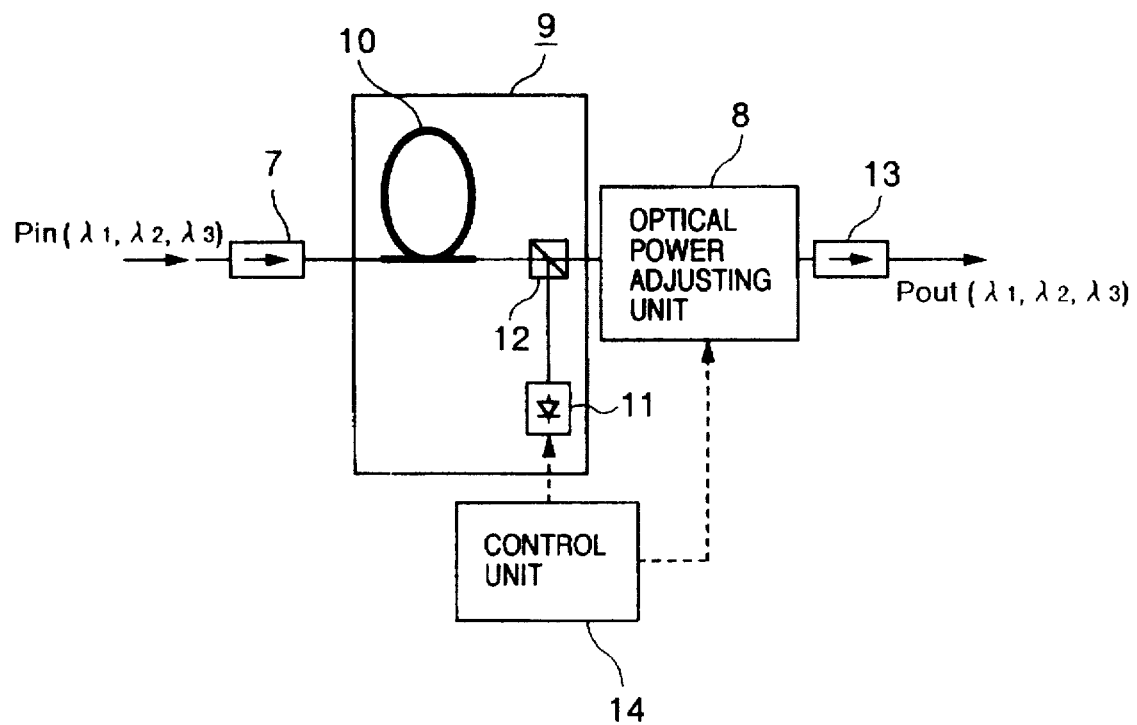
FIG. 18 is a block diagram illustrating the configuration of an optical amplification apparatus according to a fourth embodiment of the present invention.

FIG. 18 illustrates the configuration of the optical amplification apparatus according to the fourth embodiment. As illustrated, the fourth embodiment differs from the first, second and third embodiments in that the positions of the optical power adjusting unit 8 and the optical amplifier unit 9 are replaced with each other. Generally, since the optical pre-amplifier 5 does not require an excessively large optical output, output power and a deviation of power between wavelengths may be adjusted by the optical power adjusting unit 8 after the optical amplifier unit 9. This configuration can prevent optical losses from occurring before the optical amplifier unit 9, so that an optical relay 4 or an optical pre-amplifier 5 capable of reducing deterioration of the S/N ratio as the entire optical amplification apparatus can be provided in a simple configuration. It should be noted that in FIG. 18, the positions of the power adjusting unit 8 and the optical isolator 13 may be replaced with each other.

The first—fourth embodiments of the present invention have been described. In each of the foregoing embodiments, the optical filter 20 is arranged before each optical gain adjuster 17 in the optical power adjusting 8. Alternatively, in the optical amplification apparatuses other than that illustrated in FIG. 11, the optical filter 20 may be arranged after each optical gain adjuster 17 instead of arranging the optical filter 20 before each optical gain adjuster 17.

Specifically, the optical power adjusting unit 8 illustrated in FIG. 4 may be modified such that the optical filter 20b is arranged between the light combiner 23b and the optical star coupler 19, and the optical filter 20c is arranged between the light combiner 23c and the optical star coupler 19. Similarly, the optical amplification apparatus 8 illustrated in FIG. 8 may be modified such that the optical filter 20a is arranged between the light combiner 23a and the optical star coupler 19, the optical filter 20b is arranged between the light combiner 23b and the optical star coupler 19, and the optical filter 20c is arranged between the light combiner 23c and the optical star coupler 19. In the optical amplification apparatuses illustrated in FIGS. 13, 14, 17, the light combiner/separator unit 15 may be formed only of the optical star coupler 18 without arranging the optical filters 20 therein.

Also with the modified configurations, light at each wavelength only is extracted from light amplified by each optical gain adjuster 17 by the optical filter 20 arranged after each optical gain adjuster 17, in the same manner as the configurations in which the optical filter 20 is positioned before each optical gain adjuster 17, and the extracted light is inputted to the optical star coupler 19, so that the light at each wavelength adjusted by each optical gain adjuster 17 is combined by the optical star coupler 19, similarly to the foregoing respective embodiments.

It will be now appreciated from the foregoing description that the present invention provides optical amplification apparatuses capable of arbitrarily adjusting optical output power of light at respective wavelengths and a deviation of power between the lights at the respective wavelengths.

I claim:

1. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein said optical power adjusting means includes:
a plurality of paths for passing light therethrough;
a light separator for separating said received light into light at respective wavelengths included in said light and passing said separated light through each of said plurality of paths;
a light combiner for wavelength multiplexing the light at the respective wavelengths each having propagated through each of said plurality of paths; and
an optical gain adjuster arranged in at least one of said plurality of paths for amplifying or attenuating light at a wavelength propagating through said path in accordance with control of said control means.

2. An optical amplification apparatus for amplifying inputting light having signal light at a plurality of different wavelengths multiplexed thereon and outputting the amplified light comprising:

optical amplifying means for amplifying said inputted light:

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein said optical power adjusting means includes:
a plurality of paths for passing light therethrough;
a light separator for separating said received light into light at respective wavelengths included in said light and passing said separated light through each of said plurality of paths;
a light combiner for wavelength multiplexing the light at the respective wavelengths each having propagated through each of said plurality of paths; and
an optical gain adjuster arranged in at least one of said plurality of paths for amplifying or attenuating light at a wavelength propagating through said path in accordance with control of said control means.

3. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the one wavelength amplified or attenuated by said optical power adjusting means; and control means for controlling a gain of amplification or attenuation performed by said optical power adjusting means and a gain of amplification performed by said optical amplifying means, respectively, wherein said optical power adjusting means includes:
a plurality of paths for passing light therethrough;
a light splitter for splitting said received light to pass the split light through each of said plurality of paths;
a light combiner for extracting light at a particular wavelength from each light having propagated through each of said plurality of paths on each of said paths, and for wavelength multiplexing the extracted light at the respective wavelengths; and
an optical gain adjuster arranged in at least one of said plurality of paths for amplifying or attenuating light propagating through said at least one path in accordance with control of said control means.

4. An optical amplification apparatus for amplifying inputted light having signal light at a plurality of different wavelengths multiplexed thereon and outputting the amplified light comprising:

optical amplifying means for amplifying said inputted light:

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein said optical power adjusting means includes:
a plurality of paths for passing light therethrough;
a light splitter for splitting said received light to pass the split light through each of said plurality of paths;
a light combiner for extracting light at a particular wavelength from each light having propagated through each of said plurality of paths on each of said paths, and for wavelength multiplexing the extracted light at the respective wavelengths; and
an optical gain adjuster arranged in at least one of said plurality of paths for amplifying or attenuating light propagating through said at least one path in accordance with control of said control means.

5. An optical amplification apparatus for amplifying inputted light having signal light at a plurality of different wavelengths multiplexed thereon and outputting the amplified light comprising:

optical power adjusting means coupled to receive said inputted light for amplifying or attenuating at at least one wavelength included in said received light independently of the remaining light at wavelengths different from the wavelength of said light:

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein said optical power adjusting means includes:
  i) a rare earth added optical fiber amplifier including a first rare earth added optical fiber for passing said received light therethrough, a first excitation light source for outputting light for exciting said rare earth added optical fiber, and a first light combiner for said first excitation light source for introducing light outputted from said first excitation light source into said first rare earth added optical fiber; and
  ii) an adjusting light source for outputting light in the same wavelength band as light at at least one wavelength included in said received light, and a light combiner for said adjusting light source for introducing the light outputted from said light source into said rare earth added optical fiber amplifier in the direction opposite to a propagating direction of said received light.

6. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein said optical power adjusting means includes:
  i) a rare earth added optical fiber amplifier including a first rare earth added optical fiber for passing said received light therethrough, a first excitation light source for outputting light for exciting said rare earth added optical fiber, and a first light combiner for said first excitation light source for introducing light outputted from said first excitation light source into said first rare earth added optical fiber; and
  ii) an adjusting light source for outputting light in the same wavelength band as light at at least one wavelength included in said received light, and a light combiner for said adjusting light source for introducing the light outputted from said light source into said rare earth added optical fiber amplifier in the direction opposite to a propagating direction of said received light.

7. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein said control means includes:
  a storage unit for storing a plurality of parameters describing a combination of a gain of amplification performed by said optical amplifying means and a gain of amplification or attenuation performed by said optical power adjusting means; and
  a control unit for reading an arbitrary parameter from among said plurality of sets of parameters from said storage unit to control the gain or amplification performed by said optical amplifying an means and the gain of amplification or attenuation performed by said optical power adjusting means in accordance with the read parameter.

8. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein said control means includes:
  a storage unit for storing a plurality of parameters describing a combination of a gain of amplification performed by said optical amplifying means and a gain of amplification or attenuation performed by said optical power adjusting means; and
  a control unit for reading an arbitrary parameter from among said plurality of sets of parameters from said storage unit to control the gain of amplification performed by said optical amplifying means and the gain of amplification or attenuation performed by said optical power adjusting means in accordance with the read parameter.

9. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively; and further comprising:
  monitoring means for detecting power of light at respective wavelengths multiplexer on said inputted light or on the light amplified by said optical amplification apparatus,
  wherein said control means controls a gain of amplification or attenuation performed by said optical power adjusting means and a gain of amplification performed by said optical amplifying means in accordance with the power of the light at the respective wavelengths detected by said monitor means.

10. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively and further comprising:

monitoring means for detecting power of light at respective wavelengths multiplexed on said inputted light or on the light amplified by said optical amplification apparatus, wherein said control means controls a gain of amplification or attenuation performed by said optical power adjusting means and a gain of amplification performed by said optical amplifying means in accordance with the power of the light at the respective wavelengths detected by said monitor means.

11. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:
a plurality of paths for passing light therethrough;
a light separator for separating said received light into light at respective wavelengths included in said light and for passing each separated light through each of said plurality of paths;
a light combiner for wavelength multiplexing the light at the respective wavelengths each having propagated through each of said plurality of paths; and
an optical gain adjuster arranged in at least one of said plurality of paths for amplifying or attenuating light at a wavelength propagating through said path in accordance with control of said control means, said light separator includes:
a first optical coupler for splitting said received light; and
optical filters arranged between said optical coupler and said plurality of paths corresponding to the light split by said optical coupler, each said optical filter for bidirectionally transmitting only light at a particular wavelength, said light combiner includes:
an optical star coupler for combining the light at the respective wavelengths having propagated through said plurality of paths, said optical amplification apparatus comprises:
means for splitting pan of light amplified by said optical amplifying means as monitor light;
monitor light combining means for splitting said split monitor light by an optical star coupler and introducing said monitor light in the direction opposite to a propagating direction of the combined light including said light at the respective wavelengths; and
a plurality of light detecting means for detecting power of the light at the respective wavelengths split by said optical coupler for splitting said monitor light which have transmitted said plurality of optical filters in the direction opposite to a direction of the light split by said optical coupler, and said control means controls a gain of amplification or attenuation performed by said optical power adjusting means and a gain of amplification performed by said optical amplifying means, respectively, in accordance with the power of light at the respective wavelengths detected by said respective light detecting means.

12. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein:

said optical power adjusting means includes:
a plurality of paths for passing light therethrough;
a light separator for separating said received light into light at respective wavelengths included in said light and for passing each separated light through each of said plurality of paths;
a light combiner for wavelength multiplexing the light at the respective wavelengths each having propagated through each of said plurality of paths; and
an optical gain adjuster arranged in at least one of said plurality of paths for amplifying or attenuating light at a wavelength propagating through said path in accordance with control of said control means, said light separator includes:
a first optical coupler for splitting said received light; and
optical filters arranged between said optical coupler and said plurality of paths corresponding to the light split by said optical coupler, each said optical filter for bidirectionally transmitting only light at a particular wavelength, said light combiner includes:
an optical star coupler for combining the light at the respective wavelengths having propagated through said plurality of paths, said optical amplification apparatus comprises:
means for splitting part of light amplified by said optical amplifying means as monitor light;

monitor light combining means for splitting said split monitor light by an optical star coupler and introducing said monitor light in the direction opposite to a propagating direction of the combined light including said light at the respective wavelengths; and a plurality of light detecting means for detecting power of the light at the respective wavelengths split by said optical coupler for splitting said monitor light which have transmitted said plurality of optical filters in the direction opposite to a direction of the light split by said optical coupler, and said control means controls a gain of amplification or attenuation performed by optical power adjusting means and a gain of amplification performed by said optical amplifying means, respectively, in accordance with the power of light at the respective wavelengths detected by said respective light detecting means.

13. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:
a plurality of paths for passing light therethrough;
a light splitter for splitting said received light to pass each split light through each of said plurality of paths;
a light combiner for extracting light at a particular wavelength from each light having propagated through each of said plurality of paths on each of said paths, and for wavelength multiplexing the extracted light at the respective wavelengths; and
an optical gain adjuster arranged in at least one of said plurality of paths for amplifying or attenuating light propagating through said path in accordance with control of said control means, said optical amplification apparatus includes:
means for splitting part of light amplified by said optical amplifying means as monitor light;
monitor light combining means for introducing the split monitor light in the direction opposite to a propagating direction of the combined light including said light at the respective wavelengths; and a plurality of light detecting means for detecting power of the light at the respective wavelengths split by said optical coupler for splitting said monitor light which have transmitted in the direction opposite to a direction of the light combined by said optical coupler, and said control means controls a gain of amplification or attenuation performed by said optical power adjusting means and a gain of amplification performed by said optical amplifying means, respectively, in accordance with the power of the light at the respective wavelengths detected by said plurality of light detecting means.

14. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein
said optical power adjusting means includes:
a plurality of paths for passing light therethrough;
a light splitter for splitting said received light to pass each split light through each of said plurality of paths;
a light combiner for extracting light at a particular wavelength from each light having propagated through each of said plurality of paths on each of said paths, and for wavelength multiplexing the extracted light at the respective wavelengths; and
an optical gain adjuster arranged in at least one of said plurality of paths for amplifying or attenuating light propagating through said path in accordance with control of said control means, said optical amplification apparatus includes:
means for splitting part of light amplified by said optical amplifying means as monitor light;
monitor light combining means for introducing the split monitor light in the direction opposite to a propagating direction of the combined light including said light at the respective wavelengths; and a plurality of light detecting means for detecting power of the light at the respective wavelengths split by said optical coupler for splitting said monitor light which have transmitted in the direction opposite to a direction of the light combined by said optical coupler, and said control means controls a gain of amplification or attenuation performed by said optical power adjusting means and a gain of amplification performed by said optical amplifying means, respectively, in accordance with the power of the light at the respective wavelengths detected by said plurality of light detecting means.

15. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:

a plurality of paths for passing light therethrough;

a light separator for separating said received light into light at respective wavelengths included in said light and for passing each separated light through each of said plurality of paths;

a light combiner for wavelength multiplexing the light at the respective wavelengths each having propagated through each of said plurality of paths; and an optical gain adjuster arranged in at least one of said plurality of paths for amplifying or attenuating light at a wavelength propagating through said path in accordance with control of said control means, said optical separator includes:

a first optical coupler for splitting said received light; and optical filters arranged corresponding to respective light split by said optical coupler, each said optical filter for bidirectionally transmitting only light at a particular wavelength, said light combiner includes:

an optical star coupler for combining the light at the respective wavelengths each having propagated through each of said plurality of paths;

said optical amplification apparatus comprises:

means for splitting part of light amplified by said optical amplifying means as monitor light;

monitor light combining means for splitting said split monitor light by an optical star coupler and introducing said monitor light in the direction opposite to a propagating direction of the combined light including said light at the respective wavelengths; and a plurality of light detecting means for detecting power of the light at the respective wavelengths split by said optical coupler for splitting said monitor light which have transmitted said plurality of optical filters in the direction opposite to a direction of the light split by said optical coupler, and said control means controls a gain of amplification or attenuation performed by optical power adjusting means and a gain of amplification performed by said optical amplifying means, respectively, in accordance with the power of light at the respective wavelengths detected by said respective light detecting means, said control means including a comparator for comparing the power of the light at each of the respective wavelengths detected by said each light detecting means with a predetermined reference value, and means for controlling the gain of the amplification performed by said optical amplifying means in accordance with a maximum value of a difference with said reference value.

16. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein:

said optical power adjusting means includes:

a plurality of paths for passing light therethrough;

a light separator for separating said received light into light at respective wavelengths included in said light and for passing each separated light through each of said plurality of paths;

a light combiner for wavelength multiplexing the light at the respective wavelengths each having propagated through each of said plurality of paths; and an optical gain adjuster arranged in at least one of said plurality of paths for amplifying or attenuating light at a wavelength propagating through said path in accordance with control of said control means, said optical separator includes:

a first optical coupler for splitting said received light; and optical filters arranged corresponding to respective light split by said optical coupler, each said optical filter for bidirectionally transmitting only light at a particular wavelength, said light combiner includes an optical star coupler for combining the light at the respective wavelengths each having propagated through each of said plurality of paths;

said optical amplification apparatus comprises:

means for splitting part of light amplified by said optical amplifying means as monitor light;

monitor light combining means for splitting said split monitor light by an optical star coupler and introducing said monitor light in the direction opposite to a propagating direction of the combined light including said light at the respective wavelengths; and a plurality of light detecting means for detecting power of the light at the respective wavelengths split by said optical coupler for splitting said monitor light which have transmitted said plurality of optical filters in the direction opposite to a direction of the light split by said optical coupler, and said control means controls a gain of amplification or attenuation performed by said optical power adjusting means and a gain of amplification performed by said optical amplifying means, respectively, in accordance with the power of light at the respective wavelengths detected by said respective light detecting means, said control means including a comparator for comparing the power of the light at each of the respective wavelengths detected by said each light detecting means with a predetermined reference value, and means for controlling the gain of the amplification performed by said optical amplifying means in accordance with a maximum value of a difference with said reference value.

17. An optical amplification apparatus for amplifying inputted light having signal light at a plurality of different wavelengths multiplexed thereon and outputting the amplified light comprising:

optical power adjusting means coupled to receive inputted light for amplifying or attenuating light at at least one wavelength included in said received light independently of the remaining light at wavelengths different from the wavelength of said light;

optical amplifying means for amplifying said light at least one wavelength amplified or attenuated by said optical power adjusting means; and control means for controlling a gain of amplification performed by said optical amplifying means, respectively, wherein:

said optical power adjusting means includes:
a plurality of paths for passing light therethrough;
a light splitter for splitting said receive light to pass each split light through each of said plurality of paths;
a light combiner for extracting light at a particular wavelength from each light having propagated through each of said plurality of paths on each of said paths, and for wavelength multiplexing the extracted light at the respective wavelengths; and
an optical gain adjuster arranged in at least one of said plurality of paths for amplifying or attenuating light propagating through said path in accordance with control of said control means, said optical amplification apparatus includes:
means for splitting part of light amplified by said optical amplifying means as monitor light;
monitor light combining means for introducing the split monitor light in the direction opposite to a propagating direction of the combined light including said light at the respective wavelengths; and
a plurality of light detecting means for detecting power of the light at the respective wavelengths split by said optical coupler for splitting said monitor light which have transmitted in the direction opposite to a direction of the light combined by said optical coupler, and said control means controls a gain of amplification or attenuation performed by said optical power adjusting means and a gain of amplification performed by said optical amplifying means, respectively, in accordance with the power of the light at the respective wavelengths detected by said plurality of light detecting means, said control means including a comparator for comparing the power of the light at each of the respective wavelengths detected by said each light detecting means with a predetermined reference value, and means for controlling the gain of the amplification performed by said optical amplifying means in accordance with a maximum value of a difference with said reference value.

18. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein:

said optical power adjusting means includes:
a plurality of paths for passing light therethrough;
a light splitter for splitting said received light to pass each split light through each of said plurality of paths;
a light combiner for extracting light at a particular wavelength from each light having propagated through each of said plurality of paths on each of said paths, and for wavelength multiplexing the extracted light at the respective wavelengths; and
an optical gain adjuster arranged in at least one of said plurality of paths for amplifying or attenuating light propagating through said path in accordance with control of said control means, said optical amplification apparatus includes:
means for splitting part of light amplified by said optical amplifying means as monitor light;
monitor light combining means for introducing the split monitor light in the direction opposite to a propagating direction of the combined light including said light at the respective wavelengths; and
a plurality of light detecting means for detecting power of the light at the respective wavelengths split by said optical coupler for splitting said monitor light which have transmitted in the direction opposite to a direction of the light combined by said optical coupler, and said control means controls a gain of amplification or attenuation performed by said optical power adjusting means and a gain of amplification performed by said optical amplifying means, respectively, in accordance with the power of the light at the respective wavelengths detected by said plurality of light detecting means, said control means including a comparator for comparing the power of the light at each of the respective wavelengths detected by said each light detecting means with a predetermined reference value, and means for controlling the gain of the amplification performed by said optical amplifying means in accordance with a maximum value of a difference with said reference value.

19. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:
a plurality of paths for passing light therethrough;
a light separator for separating said receiving light at respective wavelengths included in said light and for passing each separated light through each of said plurality of paths;
a light combiner for wavelength multiplexing the light at the respective wavelengths each having propagated through each of said plurality of paths; and
an optical gain adjuster arranged in at least one of said plurality of paths for amplifying or attenuating light at a wavelength propagating through said path in accordance with control of said control means, and said optical gain adjuster includes:
a first rare earth added optical fiber constituting part of said paths;
a first excitation light source for outputting light for exciting said first rare earth added optical fiber; and
a light combiner for said first excitation light source for introducing light outputted by said excitation light source into said first rare earth added optical fiber.

20. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein:

said optical power adjusting means includes:
a plurality of paths for passing light therethrough;
a light separator for separating said received light into light at respective wavelengths included in said light and for passing each separated light through each of said plurality of paths;
a light combiner for wavelength multiplexing the light at the respective wavelengths each having propagated through each of said plurality of paths; and
an optical gain adjuster arranged in at least one of said plurality of paths for amplifying or attenuating light at a wavelength propagating through said path in accordance with control of said control means, and said optical gain adjuster includes:
a first rare earth added optical fiber constituting part of said paths.

21. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:
a plurality of paths for passing light therethrough;
a light splitter for splitting said received light to pass each split light through each of said plurality of paths;
a light combiner for extracting light at a particular wavelength from each light having propagated through each of said plurality of paths on each of said paths, and for wavelength multiplexing the extracted light at the respective wavelengths; and
an optical gain adjuster arranged in at least one of said plurality of paths for amplifying or attenuating light propagating through said path in accordance with control of said control means, and said optical gain adjuster includes:
a first rare earth added optical fiber constituting part of said paths;
a first excitation light source for outputting light for exciting said first rare earth added optical fiber; and
a light combiner for said first excitation light source for introducing the light outputted by said excitation light source into said first rare earth added optical fiber.

22. An optical amplification apparatus for amplifying inputted light having signal light of a plurality of different wavelength multiplexed thereon and outputting the amplified light comprising:

optical amplifying means for amplifying said inputted light;

optical amplifying means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively wherein:

said optical power adjusting means includes:
a plurality of paths for passing light therethrough;
a light splitter for splitting said received light to pass each split light through each of said plurality of paths;
a light combiner for extracting light at a particular wavelength from each light having propagated through each of said plurality of paths on each of said paths, and for wavelength multiplexing the extracted light at the respective wavelengths; and
an optical gain adjuster arranged in at least one of said plurality of paths for amplifying or attenuating light propagating through said path in accordance with control of said control means, and said optical gain adjuster includes:
a first rare earth added optical fiber constituting part of said paths:
a first excitation light source for outputting light for exciting said first rare earth added optical fiber; and a light combiner for said first excitation light source for introducing the light outputted by said excitation light source into said first rare earth added optical fiber.

23. An optical amplification apparatus for amplifying inputted light having signal light at a plurality of different wavelengths multiplexed thereon and outputting the amplified light comprising:
- optical power adjusting means coupled to receive said inputted light for amplifying or attenuating light at at least one wavelength included in said received light independently of the remaining light at wavelengths different from the wavelength of said light:
- optical amplifying means for amplifying said light at the at least one wavelength amplified or attenuated by said optical power adjusting means; and
- control means for controlling a gain of amplification or attenuation performed by said optical power adjusting means and a gain of amplification performed by said optical amplifying means, respectively, wherein:
  - said optical power adjusting means includes:
    - a plurality of paths for passing light therethrough;
    - a light separator for separating said received light into light at respective wavelengths included in said light and for passing each separated light through each of said plurality of paths;
    - a light combiner for wavelength multiplexing the light at the respective wavelengths each having propagated through each of said plurality of paths; and
    - an optical gain adjuster arranged in at least one of said plurality of paths for amplifying or attenuating light at a wavelength propagating through said path in accordance with control of said control means, and
    - said optical gain adjuster is an amplifier formed of semiconductor.

24. An optical amplification apparatus for amplifying inputted light having signal light at a plurality of different wavelengths multiplexed thereon and outputting the amplified light comprising:
- optical amplifying means for amplifying said inputted light;
- optical power adjusting means coupled to receive said light amplified by said optical amplifying means for amplifying or attenuating light at at least one wavelength included in the received light independently of the remaining light at wavelengths different from the wavelength of said light; and
- control means for controlling a gain of amplification performed by said optical amplifying means and a gain of amplification or attenuation performed by said optical power adjusting means, respectively, wherein:
  - said optical power adjusting means includes:
    - a plurality of paths for passing light therethrough;
    - a light separator for separating said received light into light at respective wavelengths included in said light and for passing each separated light through each of said plurality of paths;
    - a light combiner for wavelength multiplexing the light at the respective wavelengths each having propagated through each of said plurality of paths; and
    - an optical gain adjuster arranged in at least one of said plurality of paths for amplifying or attenuating light at a wavelength propagating through said path in accordance with control of said control means, and
    - said optical gain adjuster is an amplifier formed of semiconductor.

25. An optical amplification apparatus for amplifying inputted light having signal light at a plurality of different wavelengths multiplexed thereon and outputting the amplified light comprising:
- optical power adjusting means coupled to receive said inputted light for amplifying or attenuating light at at least one wavelength included in said received light independently of the remaining light at wavelengths different from the wavelength of said light;
- optical amplifying means for amplifying said light at the at least one wavelength amplified or attenuated by said optical power adjusting means; and
- control means for controlling a gain of amplification or attenuation performed by said optical adjusting means and a gain of amplification performed by said optical amplifying means respectively, wherein:
  - said optical power adjusting means includes:
    - a plurality of paths for passing light therethrough;
    - a light splitter for splitting said received light to pass each split light through each of said plurality of paths;
    - a light combiner for extracting light at a particular wavelength from each light having propagated through each of said plurality of paths on each of said paths, and for wavelength multiplexing the extracted light at the respective wavelengths; and
    - an optical gain adjuster arranged in at least one of said plurality of paths for amplifying or attenuating light propagating through said path in accordance with control of said control means, and
    - said optical gain adjuster is an amplifier formed of semiconductor.

26. An optical amplification apparatus for amplifying inputted light having signal light at a plurality of different wavelengths multiplexed thereon and outputting the amplified light comprising:
- optical amplifying means for amplifying said inputted light;
- optical power adjusting means coupled to receive said light amplified by said optical amplifying means for amplifying or attenuating light at at least one wavelength included in the received light independently of the remaining light at wavelengths different from the wavelength of said light; and
- control means for controlling a gain of amplification performed by said optical amplifying means and a gain of amplification or attenuation performed by said optical power adjusting means, respectively, wherein:
  - said optical power adjusting means includes:
    - a plurality of paths for passing light therethrough;
    - a light splitter for splitting said received light to pass each split light through each of said plurality of paths;
    - a light combiner for extracting light at a particular wavelength from each light having propagated through each of said plurality of paths on each of said paths, and for wavelength multiplexing the extracted light at the respective wavelengths; and
    - an optical gain adjuster arranged in at least one of said plurality of paths for amplifying or attenuating light propagating through said path in accordance with control of said control means, and
    - said optical gain adjuster is an amplifier formed of semiconductor.

27. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:

a plurality of paths for passing light therethrough;

a light separator for separating said received light into light at respective wavelengths included in said light and for passing each separated light through each of said plurality of paths;

a light combiner for wavelength multiplexing the light at the respective wavelengths each having propagated through each of said plurality of paths; and an optical gain adjuster arranged in at least one of said plurality of paths for amplifying or attenuating light at a wavelength propagating through said path in accordance with control of said control means, and said optical amplifying means is an amplifier formed of semiconductor, said amplifier formed of semiconductor having the same composition as the semiconductor forming said optical gain adjuster.

28. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelenghts different from the wavelength of said; and control means for controlling a gain of amplification performed by said optical amplifying means and a gain of amplification or attenuation performed by said optical power adjusting means, respectively, wherein:

said optical power adjusting means includes:

a plurality of paths for passing light therethrough;

a light separator for separating said received light into light at respective wavelengths included in said light and for passing each separated light through each of said plurality of paths;

a light combiner for wavelength multiplexing the light at the respective wavelengths each having propagated through each of said plurality of paths; and an optical gain adjuster arranged in at least one of said plurality of paths for amplifying or attenuating light at a wavelength propagating through said path in accordance with control of said control means, and said optical gain adjuster is an amplifier formed of semiconductor, said amplifier formed of semiconductor having the same composition as the semiconductor forming said optical amplifying means.

29. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light:

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:

a plurality of paths for passing light therethrough;

a light splitter for splitting said received light to pass each split light through each of said plurality of paths;

a light combiner for extracting light at a particular wavelength from each light having propagated through each of said plurality of paths on each of said paths, and for wavelength multiplexing the extracted light at the respective wavelengths; and an optical gain adjuster arranged in at least one of said plurality of paths for amplifying or attenuating light propagating through said path in accordance with control of said control means, and said optical gain adjuster is an amplifier formed of semiconductor, said amplifier formed of semiconductor having the same composition as the semiconductor forming said optical amplifying means.

30. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said; and control means for controlling a gain of amplification performed by said optical amplifying means and a gain of amplification or attenuation performed by said optical power adjusting means, respectively, wherein:

said optical power adjusting means includes:

a plurality of paths for passing light therethrough;

a light splitter for splitting said received light to pass each split light through each of said plurality of paths;

a light combiner for extracting light at a particular wavelength from each light having propagated through each of said plurality of paths on each of said paths, and for wavelength multiplexing the extracted light at the respective wavelengths; and an optical gain adjuster arranged in at least one of said plurality of paths for amplifying or attenuating light propagating through said path in accordance with control of said control means, and said optical gain adjuster is an amplifier formed of semiconductor, said amplifier formed of semiconductor having the same composition as the semiconductor forming said optical amplifying means.

31. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light:

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:
a plurality of paths for passing light therethrough;
a light separator for separating said received light into light at respective wavelengths included in said light and for passing each separated light through each of said plurality of paths;
a light combiner for wavelength multiplexing the light at the respective wavelengths each having propagated through each of said plurality of paths; and
an optical gain adjuster arranged in at least one of said plurality of paths for amplifying or attenuating light at a wavelength propagating through said path in accordance with control of said control means, and said optical amplifying means includes:
a second rare earth added optical fiber;
a second excitation light source for outputting light for exciting said second rare earth added optical fiber; and
a light combiner for said second excitation light source for introducing the light outputted from said second excitation light source into said second rare earth added optical fiber.

32. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein:

said optical power adjusting means includes:
a plurality of paths for passing light therethrough;
a light separator for separating said received light into light at respective wavelengths included in said light and for passing each separated light through each of said plurality of paths;
a light combiner for wavelength multiplexing the light at the respective wavelengths each having propagated through each of said plurality of paths; and
an optical gain adjuster arranged in at least one of said plurality of paths for amplifying or attenuating light at a wavelength propagating through said path in accordance with control of said control means, and said optical amplifying means includes:
a second rare earth added optical fiber;
a second excitation light source for outputting light for exciting said second rare earth added optical fiber; and
a light combiner for said second excitation light source for introducing the light outputted from said second excitation light source into said second rare earth added optical fiber.

33. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light:

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:
a plurality of paths for passing light therethrough;
a light splitter for splitting said received light to pass each split light through each of said plurality of paths;
a light combiner for extracting light at a particular wavelength from each light having propagated through each of said plurality of paths on each of said paths, and for wavelength multiplexing the extracted light at the respective wavelengths; and
an optical gain adjuster arranged in at least one of said plurality of paths for amplifying or attenuating light propagating through said path in accordance with control of said control means, and said optical amplifying means includes:
a second rare earth added optical fiber;
a second excitation light source for outputting light for exciting said second rare earth added optical fiber; and
a light combiner for said second excitation light source for introducing the light outputted from said second excitation light source into said second rare earth added optical fiber.

34. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuation light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein:

said optical power adjusting means includes:
- a plurality of paths for passing light therethrough;
- a light splitter for splitting said received light to pass each split light through each of said plurality of paths;
- a light combiner for extracting light at a particular wavelength from each light having propagated through each of said plurality of paths on each of said paths, and for wavelength multiplexing the extracted light at the respective wavelengths; and
- an optical gain adjuster arranged in at least one of said plurality of paths for amplifying or attenuating light propagating through said path in accordance with control of said control means, and said optical amplifying means includes:
- a second rare earth added optical fiber;
- a second excitation light source for outputting light for exciting said second rare earth added optical fiber; and
- a light combiner for said second excitation light source for introducing the light outputted from said second excitation light source into said second rare earth added optical fiber.

35. An optical amplification apparatus for amplifying inputted light having signal light at a plurality of different wavelengths multiplexed thereon and outputting the amplified light comprising, optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

i) a rare earth added optical fiber amplifier including a first rare earth added optical fiber for passing said received light therethrough, a first excitation light source for outputting light for exciting said rare earth added optical fiber, and a first light combiner for said first excitation light source for introducing light outputted from said first excitation light source into said first rare earth added optical fiber; and ii) an adjusting light source for outputting light in the same wavelength band as light at at least one wavelength included in said received light, and a light combiner for said adjusting light source for introducing the light outputted from said light source into said rare earth added optical fiber amplifier in the direction opposite to a propagating direction of said received light, and said optical amplifying means includes:
- a second rare earth added optical fiber having the same composition as said first rare earth added optical fiber;
- a second excitation light source for outputting light for exciting said second rare earth added optical fiber; and
- a light combiner for said second excitation light source for introducing the light outputted by said second excitation light source into said second rare earth added optical fiber.

36. An optical amplification apparatus for amplifying inputted light having signal light at a plurality of different wavelength multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein:

i) a rare earth added optical fiber amplifier including a first rare earth added optical fiber for passing said received light therethrough, a first excitation light source for outputting light for exciting said rare earth added optical fiber, and a first light combiner for said first excitation light source for introducing light outputted from said first excitation light source into said first rare earth added optical fiber; and ii) an adjusting light source for outputting light in the same wavelength band as light at at least one wavelength included in said received light, and a light combiner for said adjusting light source for introducing the light outputted from said light source into said rare earth added optical fiber amplifier in the direction opposite to a propagating direction of said received light, and said optical amplifying means includes:
- a second rare earth added optical fiber having the same composition as said first rare earth added optical fiber;
- a second excitation light source for outputting light for exciting said second rare earth added optical fiber; and
- a light combiner for said second excitation light source for introducing the light outputted by said second excitation light source into said second rare earth added optical fiber.

37. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light:

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:
   a plurality of paths for passing light therethrough;
   a light separator for separating said received light into light at respective wavelengths included in said light and for passing each separated light through each of said plurality of paths;
   a light combiner for wavelength multiplexing the light at the respective wavelengths each having propagated through each of said plurality of paths; and
   an optical gain adjuster arranged in at least one of said plurality of paths for amplifying or attenuating light at a wavelength propagating through said path in accordance with control of said control means, said optical gain adjuster includes:
   a first rare earth added optical fiber constituting part of said paths;
   a first excitation light source for outputting light for exciting said first rare earth added optical fiber; and
   a light combiner for said first excitation light source for introducing the light outputted by said excitation light source into said first rare earth added optical fiber and said optical amplifying means includes:
   a second rare earth added optical fiber having the same composition as said first rare earth added optical fiber;
   a second excitation light source for outputting light for exciting said second rare earth added optical fiber; and
   a light combiner for said second excitation light source for introducing the light outputted by said second excitation light source into said second rare earth added optical fiber.

38. An optical amplification apparatus for amplifying inputted light having signal light at a plurality of different wavelengths multiplexed thereon and outputting the amplified light comprising:
   optical amplifying means for amplifying said inputted light;
   optical power adjusting means coupled to receive said light amplified by said optical amplifying means for amplifying or attenuating light at at least one wavelength included in the received light independently of the remaining light at wavelengths different from the wavelength of said light; and
   control means for controlling a gain of amplification performed by said optical amplifying means and a gain of amplification or attenuation performed by said optical power adjusting means, respectively, wherein:
   said optical power adjusting means includes:
      a plurality of paths for passing light therethrough;
      a light separator for separating said received light into light at respective wavelengths included in said light and for passing each separated light through each of said plurality of paths;
      a light combiner for wavelength multiplexing the light at the respective wavelengths each having propagated through each of said plurality of paths; and
      an optical gain adjuster arranged in at least one of said plurality of paths for amplifying or attenuating light at a wavelength propagating through said path in accordance with control of said control means, said optical gain adjuster includes:
      a first rare earth added optical fiber constituting part of said paths;
      a first excitation light source for outputting light for exciting said first rare earth added optical fiber; and
      a light combiner for said first excitation light source for introducing the light outputted by said excitation light source into said first rare earth added optical fiber, and said optical amplifying means includes:
      a second rare earth added optical fiber having the same composition as said first rare earth added optical fiber;
      a second excitation light source for outputting light for exciting said second rare earth added optical fiber; and
      a light combiner for said second excitation light source for introducing the light outputted by said second excitation light source into said second rare earth added optical fiber.

39. An optical amplification apparatus for amplifying inputted light having signal light at a plurality of different wavelengths multiplexed thereon and outputting the amplified light comprising:
   optical power adjusting means coupled to receive said inputted light for amplifying or attenuating light at at least one wavelength included in said received light independently of the remaining light at wavelengths different from the wavelength of said light:
   optical amplifying means for amplifying said light at the at least one wavelength amplified or attenuated by said optical power adjusting means; and
   control means for controlling a gain of amplification or attenuation performed by said optical power adjusting means and a gain of amplification performed by said optical amplifying means, respectively, wherein:
   said optical power adjusting means includes:
      a plurality of paths for passing light therethrough;
      a light splitter for splitting said received light to pass each split light through each of said plurality of paths;
      a light combiner for extracting light at a particular wavelength from each light having propagated through each of said plurality of paths on each of said paths, and for wavelength multiplexing the extracted light at the respective wavelengths; and
      an optical gain adjuster arranged in at least one of said plurality of paths for amplifying or attenuating light propagating through said path in accordance with control of said control means, and said optical gain adjuster includes:
      a first rare earth added optical fiber constituting part of said paths;
      a first excitation light source for outputting light for exciting said first rare earth added optical fiber; and
      a light combiner for said first excitation light source for introducing the light outputted by said excitation light source into said first rare earth added optical fiber, and said optical amplifying means includes:
      a second rare earth added optical fiber having the same composition as said first rare earth added optical fiber;
      a second excitation light source for outputting light for exciting said second rare earth added optical fiber; and a light combiner for said second excitation light source for introducing the light outputted by said second excitation light source into said second rare earth added optical fiber.

40. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein:

said optical power adjusting means includes:

a plurality of paths for passing light therethrough;

a light splitter for splitting said received light to pass each split light through each of said plurality of paths;

a light combiner for extracting light at a particular wavelength from each light having propagated through each of said plurality of paths on each of said paths, and for wavelength multiplexing the extracted light at the respective wavelengths; and an optical gain adjuster arranged in at least one of said plurality of paths for amplifying or attenuating light propagating through said path in accordance with control of said control means, and said optical gain adjuster includes:

a first rare earth added optical fiber constituting part of said paths;

a first excitation light source for outputting light for exciting said first rare earth added optical fiber; and a light combiner for said first excitation light source for introducing the light outputted by said excitation light source into said first rare earth added optical fiber, and said optical amplifying means includes:

a second rare earth added optical fiber having the same composition as said first rare earth added optical fiber;

a second excitation light source for outputting light for exciting said second rare earth added optical fiber; and a light combiner for said second excitation light source for introducing the light outputted by said second excitation light source into said second rare earth added optical fiber.

41. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:

a plurality of paths for passing light therethrough;

a light splitter for splitting said received light to pass each split light through each of said plurality of paths;

a light combiner for extracting light at a particular wavelength from each light having propagated through each of said plurality of paths on each of said paths, and for wavelength multiplexing the extracted light at the respective wavelengths; and an optical gain adjuster arranged in at least one of said plurality of paths for amplifying or attenuating light propagating through said path in accordance with control of said control means, and a wavelength of light outputted by said first excitation light source ranges from 780 nm to 860 nm.

42. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein:

said optical power adjusting means includes:

a plurality of paths for passing light therethrough;

a light splitter for splitting said received light to pass each split light through each of said plurality of paths;

a light combiner for extracting light at a particular wavelength from each light having propagated through each of said plurality of paths on each of said paths, and for wavelength multiplexing the extracted light at the respective wavelengths; and an optical gain adjuster arranged in at least one of said plurality of paths for amplifying or attenuating light propagating through said path in accordance with control of said control means, and a wavelength of light outputted by said first excitation light source ranges from 780 nm to 860 nm.

43. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:

a plurality of paths for passing light therethrough;

a light separator for separating said received light into light at respective wavelengths included in said light and for passing each separated light through each of said plurality of paths;

a light combiner for wavelength multiplexing the light at the respective wavelengths each having propagated through each of said plurality of paths; and an optical gain adjuster arranged in at least one of said plurality of paths for amplifying or attenuating light at a wavelength propagating through said path in accordance with control of said control means, said optical gain adjuster includes:

a first rare earth added optical fiber constituting part of said paths;

a first excitation light source for outputting light for exciting said first rare earth added optical fiber; and a light combiner for said first excitation light source for introducing the light outputted by said excitation light source into said first rare earth added optical fiber, and a wavelength of the light outputted by said first excitation light source ranges from 780 nm to 860 nm.

44. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein:

said optical power adjusting means includes:

a plurality of paths for passing light therethrough;

a light separator for separating said received light into light at respective wavelengths included in said light and for passing each separated light through each of said plurality of paths;

a light combiner for wavelength multiplexing the light at the respective wavelengths each having propagated through each of said plurality of paths; and an optical gain adjuster arranged in at least one of said plurality of paths for amplifying or attenuating light at a wavelength propagating through said path in accordance with control of said control means, said optical gain adjuster includes:

a first rare earth added optical fiber constituting part of said paths;

a first excitation light source for outputting light for exciting said first rare earth added optical fiber; and a light combiner for said first excitation light source for introducing the light outputted by said excitation light source into said first rare earth added optical fiber, and a wavelength of the light outputted by said first excitation light source ranges from 780 nm to 860 nm.

45. An optical amplification apparatus for amplifying inputted light having signal light at a plurality of different wavelengths multiplexed thereon and outputting the amplified light comprising:

optical power adjusting means coupled to receive said inputted light for amplifying or attenuating light at at least one wavelength included in said received light independently of the remaining light at wavelengths different from the wavelength of said light;

optical amplifying means for amplifying said light at the at least one wavelength amplified or attenuated by said optical power adjusting means; and control means for controlling a gain of amplification or attenuation performed by said optical power adjusting means and a gain of amplification performed by said optical amplifying means, respectively, wherein:

said optical power adjusting means includes:

a plurality of paths for passing light therethrough;

a light splitter for splitting said received light to pass each split light through each of said plurality of paths;

a light combiner for extracting light at a particular wavelength from each light having propagated through each of said plurality of paths on each of said paths, and for wavelength multiplexing the extracted light at the respective wavelengths; and an optical gain adjuster arranged in at least one of said plurality of paths for amplifying or attenuating light propagating through said path in accordance with control of said control means, said optical gain adjuster includes:

a first rare earth added optical fiber constituting part of said paths;

a first excitation light source for outputting light for exciting said first rare earth added optical fiber; and a light combiner for said first excitation light source for introducing the light outputted by said first excitation light source into said first rare earth added optical fiber, and a wavelength of the light outputted by said first excitation light source ranges from 780 nm to 860 nm.

46. An optical amplification apparatus for amplifying inputted light having signal light at a plurality of different wavelengths multiplexed thereon and outputting the amplified light comprising:

optical amplifying means for amplifying said inputted light;

optical power adjusting means coupled to receive said light amplified by said optical amplifying means for amplifying or attenuating light at at least one wavelength included in the received light independently of the remaining light at wavelengths different from the wavelength of said light; and control means for controlling a gain of amplification performed by said optical amplifying means and a gain of amplification or attenuation performed by said optical power adjusting means, respectively, wherein:

said optical power adjusting means includes:

a plurality of paths for passing light therethrough;

a light splitter for splitting said received light to pass each split light through each of said plurality of paths;

a light combiner for extracting light at a particular wavelength from each light having propagated through each of said plurality of paths on each of said paths, and for wavelength multiplexing the extracted light at the respective wavelengths; and an optical gain adjuster arranged in at least one of said plurality of paths for amplifying or attenuating light propagating through said path in accordance with control of said control means, said optical gain adjuster includes:
- a first rare earth added optical fiber constituting part of said paths;
- a first excitation light source for outputting light for exciting said first rare earth added optical fiber; and
- a light combiner for said first excitation light source for introducing the light outputted by said first excitation light source into said first rare earth added optical fiber, and a wavelength of the light outputted by said first excitation light source ranges from 780 nm to 860 nm.

47. An optical amplification apparatus for amplifying inputted light having signal light at a plurality of different wavelengths multiplexed thereon and outputting the amplified light, comprising:

first optical amplifying means for amplifying said inputted light;

optical power adjusting means coupled to receive said light amplified by said optical amplifying means for amplifying or attenuating light at at least one wavelength included in said received light independently of light at wavelengths different from the wavelength of said light;

a second optical amplifying means for amplifying the light at the at least one wavelength amplified or attenuated by said optical power adjusting means; and control means for controlling a gain of amplification or attenuation performed by said optical power adjusting means a gain of amplification performed by said first optical amplifying means, and a gain of amplification performed by said second optical amplifying means, wherein:

said first optical amplifying means includes:
- a first rare earth added optical fiber for passing said inputted light therethrough;
- an excitation light source for outputting light for exciting said first rare earth added optical fiber;
- splitting means for splitting the light outputted by said excitation light source; and
- a first light combiner for said excitation light source for introducing the light split by said splitting means into said first rare earth added optical fiber, and said second optical amplifying means includes:
- a second rare earth added optical fiber for passing therethrough the light at the at least one wavelength amplified or attenuated by said optical power adjusting means; and
- a second light combiner for said excitation light source for introducing light different from the light split by said splitting means and introduced into said first rare earth added optical fiber, into said second rare earth added optical fiber.

* * * * *